(12) United States Patent
Bowman et al.

(10) Patent No.: US 11,760,399 B2
(45) Date of Patent: *Sep. 19, 2023

(54) WAGON WITH FOOTWELL AND HANDLE

(71) Applicant: VEER GEAR, LLC, Milton, GA (US)

(72) Inventors: Andrew Bowman, Milton, GA (US);
Brady Schroeder, Milton, GA (US)

(73) Assignee: Veer Gear LLC, Milton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,072

(22) Filed: Nov. 22, 2021

(65) Prior Publication Data

US 2022/0073118 A1 Mar. 10, 2022

Related U.S. Application Data

(63) Continuation of application No. 16/686,454, filed on Nov. 18, 2019, now Pat. No. 11,198,460, which is a
(Continued)

(51) Int. Cl.
*B62B 3/02* (2006.01)
*B62B 9/12* (2006.01)
(Continued)

(52) U.S. Cl.
CPC .............. *B62B 3/02* (2013.01); *B62B 3/144* (2013.01); *B62B 3/1468* (2013.01); *B62B 7/008* (2013.01);
(Continued)

(58) Field of Classification Search
CPC ....... B62B 3/144; B62B 3/1468; B62B 7/008; B62B 7/12; B62B 9/12; B62B 3/02; B62B 5/067
See application file for complete search history.

(56) References Cited

U.S. PATENT DOCUMENTS

| 1,059,504 A | 4/1913 | Teppert |
| 2,111,974 A | 3/1938 | Kroll et al. |

(Continued)

FOREIGN PATENT DOCUMENTS

| CN | 101177106 | 5/2008 |
| CN | 101161603 Y | 12/2008 |

(Continued)

OTHER PUBLICATIONS

Joint Claim Construction and Pre-Hearing Statement, Litigation, Case No. 3:20-cv-00030, May 27, 2022, 15 pages.
(Continued)

*Primary Examiner* — Jason D Shanske
*Assistant Examiner* — James J Triggs
(74) *Attorney, Agent, or Firm* — Kilpatrick Townsend & Stockton LLP

(57) ABSTRACT

Consumer wagons are provided for carrying seated children and/or household cargo. In some embodiments, the wagons have a footwell for children carried in the wagon to place/rest their feet, and the footwell is repositionable between use position lowered relative to the wagon base and a collapsed/storage position closer to the wagon base. And in some embodiments, the wagons have a pull-handle that can be moved between different positions and that is lockable in multiple of the different positions.

42 Claims, 31 Drawing Sheets

Related U.S. Application Data continuation of application No. 15/453,329, filed on Mar. 8, 2017, now Pat. No. 10,507,857.

(60) Provisional application No. 62/307,726, filed on Mar. 14, 2016, provisional application No. 62/305,017, filed on Mar. 8, 2016.

(51) Int. Cl.
  *B62B 7/12* (2006.01)
  *B62B 7/00* (2006.01)
  *B62B 3/14* (2006.01)
  *B62B 5/06* (2006.01)

(52) U.S. Cl.
  CPC ............... *B62B 7/12* (2013.01); *B62B 9/12* (2013.01); *B62B 5/067* (2013.01)

(56) References Cited

U.S. PATENT DOCUMENTS

| | | | |
|---|---|---|---|
| 2,563,995 A | 8/1951 | East | |
| 2,767,996 A | 10/1956 | Seyforth | |
| 2,879,072 A | 3/1959 | Rear et al. | |
| 4,116,465 A | 9/1978 | Maclaren | |
| 4,597,116 A | 7/1986 | Kassai | |
| 4,624,467 A | 11/1986 | Burns | |
| 4,746,140 A | 5/1988 | Kassai et al. | |
| 4,768,806 A | 9/1988 | Tetreault | |
| 4,811,968 A | 3/1989 | Bolden | |
| 4,834,415 A | 5/1989 | Yee | |
| 4,887,836 A | 12/1989 | Simjian | |
| 5,056,805 A | 10/1991 | Wang | |
| 5,360,222 A | 11/1994 | Bro et al. | |
| 5,538,267 A | 7/1996 | Pasin et al. | |
| 5,772,279 A | 6/1998 | Johnson, Jr. | |
| 5,833,251 A | 11/1998 | Peck | |
| 5,887,935 A | 3/1999 | Sack | |
| 5,957,482 A | 9/1999 | Shorter | |
| 6,053,515 A | 4/2000 | Kelley | |
| 6,220,611 B1 | 4/2001 | Shapiro | |
| 6,286,844 B1 | 9/2001 | Cone, II et al. | |
| 6,641,149 B2 | 11/2003 | Chiappetta et al. | |
| 6,733,026 B1 | 5/2004 | Robberson et al. | |
| 6,845,991 B1 | 1/2005 | Ritucci et al. | |
| 6,902,184 B2 | 6/2005 | Hsu | |
| 6,916,028 B2 | 7/2005 | Shapiro | |
| 6,932,365 B2 | 8/2005 | Chiappetta et al. | |
| 6,962,370 B2 | 11/2005 | Simpson | |
| 7,462,009 B2 | 12/2008 | Hartmann et al. | |
| 7,487,977 B2 | 2/2009 | Johnson | |
| 7,523,955 B2 | 4/2009 | Blair | |
| 7,866,686 B2 | 1/2011 | Conaway et al. | |
| 7,992,882 B2 | 8/2011 | Engelman | |
| 8,091,916 B2 | 1/2012 | Shapiro | |
| 8,191,907 B2 | 6/2012 | Watson | |
| 8,388,015 B2 | 3/2013 | Chen | |
| 8,453,771 B1 | 6/2013 | Hirschfeld | |
| 8,456,771 B2 | 6/2013 | Weber et al. | |
| 8,622,404 B2 | 1/2014 | Chen et al. | |
| 8,827,282 B2 | 9/2014 | Schlegel et al. | |
| 8,851,505 B2 | 10/2014 | Van Gelderen et al. | |
| 8,955,855 B2 | 2/2015 | Herlitz et al. | |
| 8,955,869 B2 | 2/2015 | Zehfuss | |
| 9,108,656 B1 | 8/2015 | Nolan et al. | |
| 9,199,659 B2 | 12/2015 | Chen et al. | |
| 9,327,749 B2 | 5/2016 | Young et al. | |
| 9,333,977 B2 | 5/2016 | Herlitz et al. | |
| 9,365,225 B2 | 6/2016 | Henao | |
| 9,469,324 B2 | 10/2016 | Bowman et al. | |
| 10,106,186 B2 | 10/2018 | Choi | |
| 10,507,857 B2* | 12/2019 | Bowman | B62B 7/008 |
| 11,198,460 B2 | 12/2021 | Bowman et al. | |
| 2002/0121753 A1 | 9/2002 | Suzuki | |
| 2003/0025301 A1 | 2/2003 | Banuelos, III | |
| 2003/0071427 A1 | 4/2003 | Simione | |
| 2003/0075903 A1 | 4/2003 | Hsia | |
| 2003/0085552 A1* | 5/2003 | Shapiro | B62B 7/10 |
| | | | 280/646 |
| 2004/0232639 A1 | 11/2004 | Chiappetta et al. | |
| 2005/0012307 A1 | 1/2005 | Shapiro | |
| 2006/0213735 A1 | 9/2006 | Weinstein et al. | |
| 2007/0152478 A1 | 7/2007 | Siesholtz et al. | |
| 2007/0228697 A1 | 10/2007 | Miller et al. | |
| 2007/0284900 A1 | 12/2007 | Sze | |
| 2008/0174155 A1 | 7/2008 | Engelman | |
| 2009/0033066 A1 | 2/2009 | Saville et al. | |
| 2010/0109271 A1 | 5/2010 | Funakura | |
| 2010/0156060 A1 | 6/2010 | Dotsey et al. | |
| 2010/0156069 A1 | 6/2010 | Chen | |
| 2010/0194065 A1 | 8/2010 | Mountz et al. | |
| 2011/0025005 A1 | 2/2011 | Howell | |
| 2011/0101649 A1 | 5/2011 | Harding | |
| 2011/0169235 A1 | 7/2011 | Moster | |
| 2011/0170948 A1 | 7/2011 | Williams et al. | |
| 2011/0175332 A1 | 7/2011 | Jones et al. | |
| 2012/0056452 A1 | 3/2012 | Longenecker et al. | |
| 2012/0119457 A1 | 5/2012 | Williams | |
| 2012/0235372 A1 | 9/2012 | Herlitz et al. | |
| 2012/0261961 A1 | 10/2012 | Heisey et al. | |
| 2014/0319884 A1 | 10/2014 | Doucette et al. | |
| 2014/0353945 A1* | 12/2014 | Young | B62B 5/08 |
| | | | 280/650 |
| 2015/0210307 A1 | 7/2015 | Kalinin et al. | |
| 2016/0023674 A1 | 1/2016 | Nolan et al. | |
| 2016/0031469 A1 | 2/2016 | Bowman et al. | |
| 2017/0326019 A1 | 11/2017 | Bramsiepe et al. | |

FOREIGN PATENT DOCUMENTS

| | | |
|---|---|---|
| CN | 101397025 | 4/2009 |
| CN | 102050140 | 5/2011 |
| CN | 202641776 | 1/2013 |
| CN | 203832526 | 9/2014 |
| DE | 202006012430 | 10/2006 |
| EP | 1167157 A1 | 1/2002 |
| EP | 1479590 | 11/2004 |
| GB | 2494897 A | 3/2013 |
| KR | 101573235 B1 | 11/2015 |
| NL | 2007020 C2 | 6/2011 |
| WO | 2004002802 | 1/2004 |
| WO | 2015038373 | 3/2015 |
| WO | 2016018713 | 2/2016 |
| WO | 2018067450 | 4/2018 |

OTHER PUBLICATIONS

U.S. Appl. No. 62/307,726, Appendix to Joint Claim Construction and Pre-Hearing Statement, Litigation, Case No. 3:20-cv-00030, Jun. 27, 2022, 44 pages.

U.S. Appl. No. 62/305,017, Appendix to Joint Claim Construction and Pre-Hearing Statement, Litigation, Case No. 3:20-cv-00030, Jun. 27, 2022, 39 pages.

Dictionary Definitions, Appendix to Joint Claim Construction and Pre-Hearing Statement, Litigation, Case No. 3:20-cv- 00030, Jun. 27, 2022, 229 pages.

Dictionary Definitions, Corrected Appendix to Joint Claim Construction and Pre-Hearing Statement, Litigation, Case No. 3:20-cv-00030, Jul. 5, 2022, 234 pages.

Litigation-Plaintiff Evenflo Company, Inc.'s Amended Invalidity Contentions, Case 3:20-cv-00030, Apr. 4, 2022, 66 pages.

Litigation-Plaintiff Evenflo Company, Inc.'s S.D. Ohio Pat. R. 103.4 Disclosure of Amended Invalidity Contentions, Case No. 3:20-cv-00030, Oct. 7, 2021, 194 pages.

Litigation-Plaintiff Evenflo Company, Inc.'s S.D. Ohio Pat. R. 103.4 Disclosure of Invalidity Contentions, Case No. 3:20-cv-00030, Oct. 26, 2020, 150 pages.

Invalidity Chart for U.S. Pat. No. 10,106,186 titled "Baby Wagon with Improved Ease of Use" to Yejin Choi ("Choi '186"), Apr. 4, 2022, 198 pages.

(56) References Cited

OTHER PUBLICATIONS

Invalidity Chart for U.S. Patent Publication No. 2010/0156060 titled "Reversible Stroller Handle" to Michael A. Dotsey, et al. ("Dotsey '6060"), Apr. 4, 2022, 127 pages.
Invalidity Chart for U.S. Pat. No. 6,916,028 titled "Collapsible Compact Carrier Device with Collapsible Wheel Construction" to Richard N. Shapiro ("Shapiro '028"), Apr. 4, 2022, 314 pages.
Invalidity Chart for U.S. Pat. No. 4,116,465 titled "Baby Carriages" to Owen F. Maclaren ("MacLaren '465"), Apr. 4, 2022, 183 pages.
Invalidity Chart for U.S. Patent Publication No. 2017/0326019 titled "Mobile Walking and Transport Aid Device" to Hodger Bramsiepe and Guenter Kurt Rood ("Bramsiepe '6019"), Apr. 4, 2022, 162 pages.
Invalidity Chart for U.S. Pat. No. 9,327,749 titled "Foldable Wagon" to Matthew E. Young, Randall A. Sandlin, Thomas K. Schlegel, and Cameron Eckert ("Young '749"), Apr. 4, 2022, 220 pages.
Invalidity Chart for U.S. Pat. No. 4,746,140 titled "Baby Carriage" to Kenzou Kassai ("Kassai '140"), Apr. 4, 2022, 221 pages.
Invalidity Chart for U.S. Pat. No. 4,834,415 titled "Dual-Seat Foldable Baby Cart" to Bruce Yee ("Yee '415"), Apr. 4, 2022, 164 pages.
Invalidity Chart for U.S. Patent Publication No. 2002/0121753 titled Folder Stroller to Yoshiyuki Suzuki ("Suzuki '1753"), Apr. 4, 2022, 125 pages.
Invalidity Chart for U.S. Pat. No. 5,056,805 titled "Stroller" to Chia-Ho Wang ("Wang '805"), Apr. 4, 2022, 129 pages.
Invalidity Chart with Combination Citations, Apr. 4, 2022, 215 pages.
Invalidity Chart for U.S. Pat. No. 9,108,656 titled "Collapsible Wagon" to Patrick Nolan, Mike Dotsey, Noah Dingler, and Brady Schroeder ("Nolan '656"), Apr. 4, 2022, 199 pages.
Invalidity Chart for U.S. Patent Publication No. 2010/0109271 titled "Stroller" to Funakura ("Funakura '9271"), Apr. 4, 2022, 174 pages.
Invalidity Chart for U.S. Pat. No. 9,365,225 titled "Transformative Hand Cart" to Elvis Henao ("Henao '225"), Apr. 4, 2022, 330 pages.
Invalidity Chart for U.S. Patent Publication No. 2010/0156069 A1 titled "Wagon with Seats" to Zhaosheng Chen ("Chen '6069"), Apr. 4, 2022, 326 pages.
Brief by Plaintiff Evenflo Company, Inc., Case No. 3:20-cv-00030, Jul. 29, 2022, 25 pages.
Brief by Defendant Veer Gear LLC., with Exhibits 1 and 2, Case No. 3:20-cv-00030, Jul. 29, 2022, 123 pages.
Response Claim Construction Brief re USP '460 by Defendant Veer Gear LLC, Case No. 3:20-cv-00030, Aug. 26, 2022, 27 pages.
Response Claim Construction Brief by Counter Defendants Evenflo Company, Inc., with Exhibit H, Case No. 3:20-cv-00030, Aug. 26, 2022, 70 pages.
Transcript of Proceedings, Claim Construction Hearing., Case No. 3:20-cv-00030, Oct. 6, 2022, 87 pages.
Memorandum and Opinion, Case No. 3:20-cv-00030, Nov. 28, 2022, 19 pages.
Motion for Partial Reconsideration by Defendant, Case No. 3:20-cv-00030, Dec. 6, 2022, 6 pages.
Litigation-Evenflo Company Inc's Answer to Vear Geer LLC's Counterclaim for Patent Infringement and Counterclaim for Declaratory Judgement of Invalidity Case: 3:20-cv-00030-TMR Doc, May 19, 2020, 25 pages.
BOB Revolution Flex 3.0 Duallie Double Jogging Stroller, Strolleria, 2005, 3 pages.
Two Seat Wagon, Bekhic, 2014, 9 pages.
CLEVR 3-in-1 Double 2 Seat Bike Trailer Stroller Jogger for Kids, Grey, eBay, 2015, 5 pages.
Complaint for Declatory Judgement of Invalidity, Litigation-Veer Gear LLC's Answer to Evenflo Company Inc., Jan. 27, 2020, 259 pages.
Veer Gear LLC's Answer to Evenflo Company Inc's Counterclaim for Declaration Judgement of Invalidity of U.S. Pat. No. 10,597,058, Case: 3:20-cv-00030-TMR, Jun. 8, 2020, 4 pages.
Creative Outdoor Double Seat Folding Wagon, Page Vault, 2014, 5 pages.
Defendant Veer Gear LLC's Opening Claim Constructions Brief, Litigation, Case No. 3:20-cv-00030-TMR Doc#, Apr. 13, 2021, 39 pages.
Fisher Price Kid Utility Vehicle Amazon.com, 2006, 10 pages.
Baby Jogger City Select Stroller: Baby, Amazon.com, 2014, 8 pages.
Joint Claim Construction and Prehearing Statement Pursuant to S.D. Ohio Pat. R. 105.2 (D), Litigation-Joint Claim, Case No. 3:20-cv-00030, Jan. 28, 2021, 34 pages.
Memorandum Opinion, Case: 3:20-cv-00030-TMR Doc, Aug. 24, 2021, 20 pages.
Civil Cover sheet, Cases: 3:20-Cv-00030-TMR Doc, Jan. 28, 2020, 2 pages.
Complaint for Declaratory Judgement of Invalidity, Case: 3:20-cv-00030-TMR Doc, Jan. 27, 2020, 259 pages.
IInfantastic FAH17 Mustard Gold Bicycle Trailer, Amazon.co.uk: Baby, 2012, 5 pages.
Morgan Cycle Coach Wagon, Walmart.com, 2011, 6 pages.
Peg Perego Duette Piroet in Atmosphere, Page Vault, 2009 7 pages.
Plaintiff/Counterclaim Defendant Evenflo Company, Inc.'s S.D. Ohio Pat. R. 105.4(a) Opening Claim Construction Brief, Case No. 3:20-cv-00030-TMR Doc#25, Apr. 13, 2021, 22 pages.
Radio Flyer 3 in 1 EZ Fold Wagon with Canopy—Red: Target, 2014, 8 pages.
Special Tomato Jogger Push Chair, Needs All-Terrain Stroller, 2014, 7 pages.
Step2 Neighborhood Wagon with Seats, Amazon.com, 2015, 9 pages.
Tag-Along Kids Bike Trailer Bicycle Pram Stroller Children Jogger Green, Buy Bike Trailers, Mydeal, Feb. 2016, 5 pages.
Veer Gear's Reply in Support of Opening Claim Construction Brief, Litigation-Defendant, United States District Court for the Southern District of Ohio Western Division, May 27, 2021, 26 pages.
U.S. Appl. No. 15/453,329, Non-Final Office Action dated Jun. 28, 2018, 7 pages.
U.S. Appl. No. 15/453,329, Non-Final Office Action dated Jan. 22, 2019, 7 pages.
U.S. Appl. No. 15/453,329, Non-Final Office Action dated Sep. 20, 2017, 7 pages.
U.S. Appl. No. 15/453,329, Notice of Allowance dated Jul. 25, 2019, 10 pages.
U.S. Appl. No. 16/686,454, Final Office Action dated Jul. 22, 2020, 16 pages.
U.S. Appl. No. 16/686,454, Non-Final Office Action dated Dec. 20, 2019, 10 pages.
U.S. Appl. No. 16/686,454, Non-Final Office Action dated Aug. 30, 2021, 11 pages.
U.S. Appl. No. 16/686,454, Non-Final Office Action dated Feb. 17, 2021, 9 pages.
U.S. Appl. No. 16/686,454, Notice of Allowance dated Nov. 5, 2021, 9 pages.
Boorman et al., The Design and Fabrication of an Upright Collapsible Transport System for Pushing Children Collapsible Kid Cruiser, ASEE 2014 Zone I Conference, Collapsible Kid Cruiser, ASEE Zone, Apr. 3-5, 2014.
European Application No. 17763992.9, Extended European Search Report dated Nov. 11, 2019, 8 pages.
European Application No. EP17763992.9, Office Action dated Nov. 11, 2021, 5 pages.
Lackey, Erovr Transformable Dolly, Wagon, & Cart ("EROVR"), CineD, Apr. 11, 2016, 12 pages.
International Application No. PCT/US2014/053780, International Search Report and Written Opinion dated Feb. 6, 2015, 11 pages.
International Application No. PCT/US2015/041743, International Search Report and Written Opinion dated Oct. 9, 2015, 9 pages.
International Application No. PCT/US2017/021342, International Search Report and Written Opinion dated May 25, 2017, 8 pages.
International Application No. PCTUS2017021342, International Preliminary Report on Patentability dated Sep. 20, 2018, 6 pages.

(56) References Cited

OTHER PUBLICATIONS

Schroeder, Standard Consumer Safety Performance Specification for Carriages and Strollers, ASTM, Designation: F833-15, Feb. 13, 2016, 23 pages.
International Application No. PCT/US2017/054739, International Search Report and Written Opinion, dated Dec. 15, 2017, 14 pages.
Veer Gear LLC's Answer to Evenflo Company Inc.'s Complaint for Declaratory Judgment of Invalidity and Supplemental CounterClaims for Patent Infringement, Litigation, Case No. 3:20-cv-00030, Feb. 15, 2022, 32 pages.
Evenflo Company Inc.'s Answer to Veer Gear LLC's Supplemental CounterClaims for Patent Infringement, Litigation, Case No. 3:20-cv-00030, Mar. 7, 2022, 16 pages.

* cited by examiner

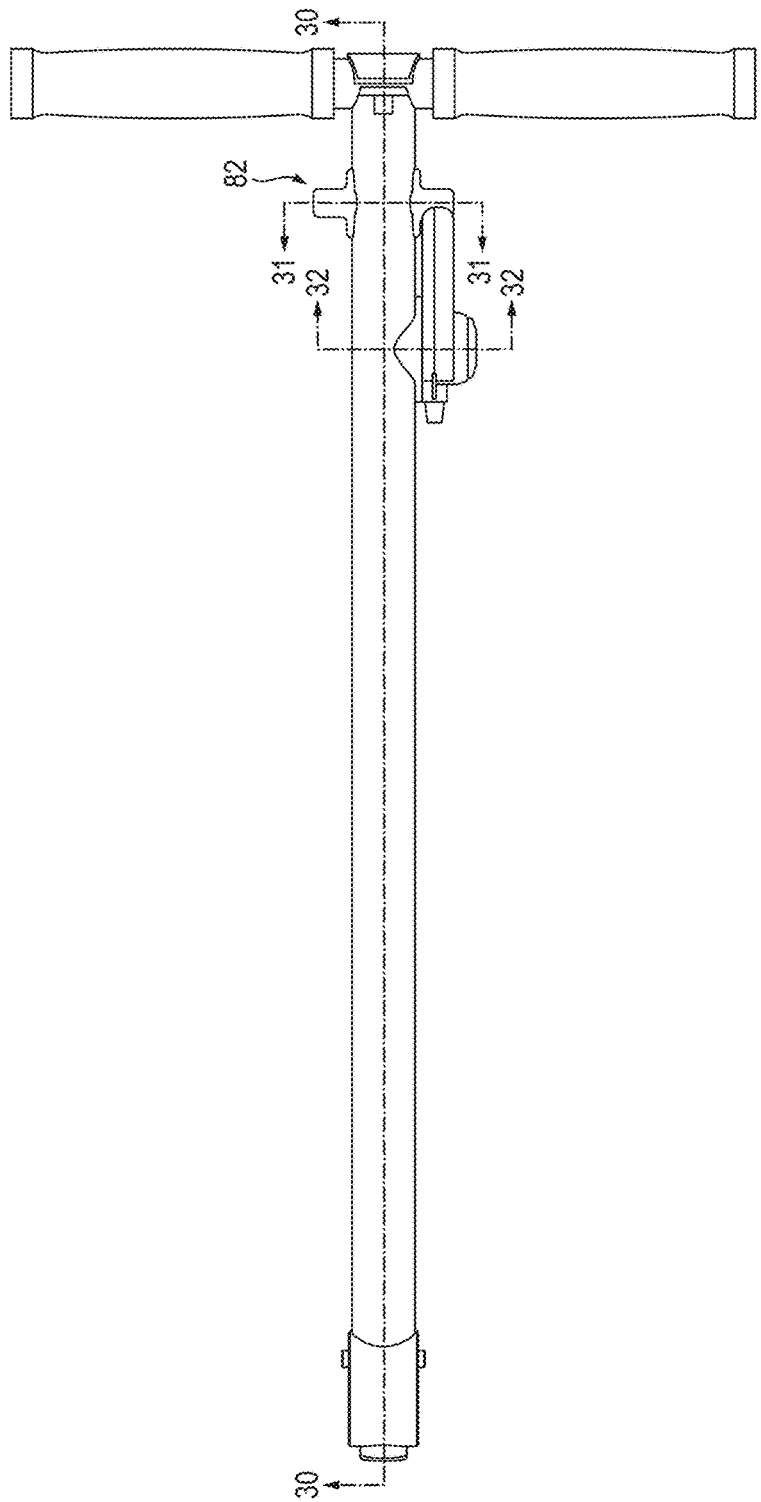
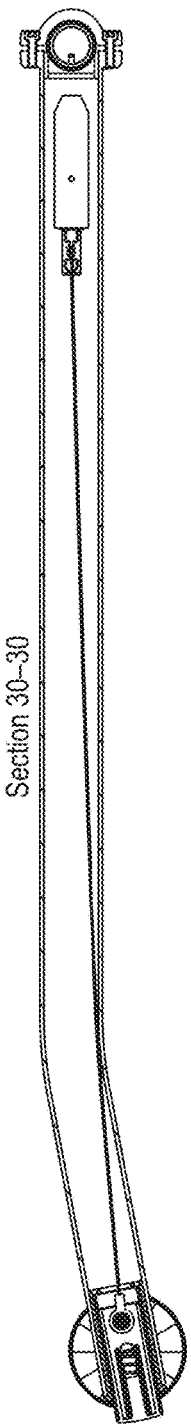
FIG. 29
FIG. 30

WAGON WITH FOOTWELL AND HANDLE

CROSS-REFERENCE TO RELATED APPLICATION

This application is a continuation of U.S. application Ser. No. 16/686,454, filed Nov. 18, 2019, which is continuation of U.S. Ser. No. 15/453,329, filed Mar. 8, 2017, U.S. Provisional Patent Application Ser. No. 62/307,726, filed Mar. 14, 2016, and U.S. Provisional Patent Application Ser. No. 62/305,017, filed Mar. 8, 2016, which are hereby incorporated herein by reference.

TECHNICAL FIELD

The present invention relates generally to consumer-use wagons, and particularly to pull-handle wagons for multi-purpose use including carrying seated children and/or household cargo.

BACKGROUND

Conventional consumer-use wagons are commonly used for holding and carrying cargo such as children, their toys, beach items (e.g., chairs, towels, and sand buckets/shovels), and sports equipment (e.g., balls, bats, and helmets). Such wagons typically include a generally rectangular base and four generally rectangular upright walls forming an open-topped container, with a pull handle pivotally coupled to the base front, and with four wheels rotationally mounted to the base bottom. A traditional and well-known wagon of this type is the classic RADIO FLYER wagon.

While these wagons have their advantages, they also have some drawbacks. Accordingly, needs exist for improved features for consumer-use wagons for multi-purpose use. It is to the provision of solutions to these and other problems that the present invention is primarily directed.

SUMMARY

Generally described, the present invention relates to consumer-use wagons for multi-purpose use including carrying seated children and/or household cargo. In some embodiments, the wagons have a footwell for children carried in the wagon to place/rest their feet, and the footwell is repositionable between an extended/use position lowered relative to the wagon base and a collapsed/storage position closer to the wagon base. And in some embodiments, the wagons have a pull-handle that can be moved between different positions and that is lockable in multiple of the different positions.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIGS. 27-42 show a wagon with a position-locking handle feature according to a sixth example embodiment of the invention.

DETAILED DESCRIPTION OF EXAMPLE EMBODIMENTS

Generally described, the present invention relates to a consumer-use wagon that includes a base and a peripheral wall arrangement that together form a container, and that additionally includes a collapsible footwell, a position-locking handle, or both. It will be understood that the specific dimensions and proportions identified herein are representative for illustration purposes only, and are not limiting of the invention; in fact the invention expressly contemplates and covers many other embodiments with different dimensions, proportions, assembly methods, and overall designs.

The collapsible footwell includes a footrest that is positionable between an extended/use position lowered relative to the base and a collapsed/storage position closer to the base to provide a compact profile/arrangement to reduce the occupied footwell volume for storage and/or transport purposes. In the collapsed/storage position, the vacated space where the footwell was in the extended/use position effectively reduces the height dimension of the wagon with the wheels displaced (e.g., removed or folded to adjacent the base) to provide a smaller size for transportation and storage, for example during shipping from the manufacturer and/or the retailer, during storage in a user's garage, and/or during transport in a user's personal vehicle. The overall height of the wagon, with the wheels displaced and the upright walls folded down, is thus significantly reduced, thereby significantly reducing its package size for shipment from the manufacturer and/or retailer, and thereby significantly reducing shipping costs.

Figure 1:
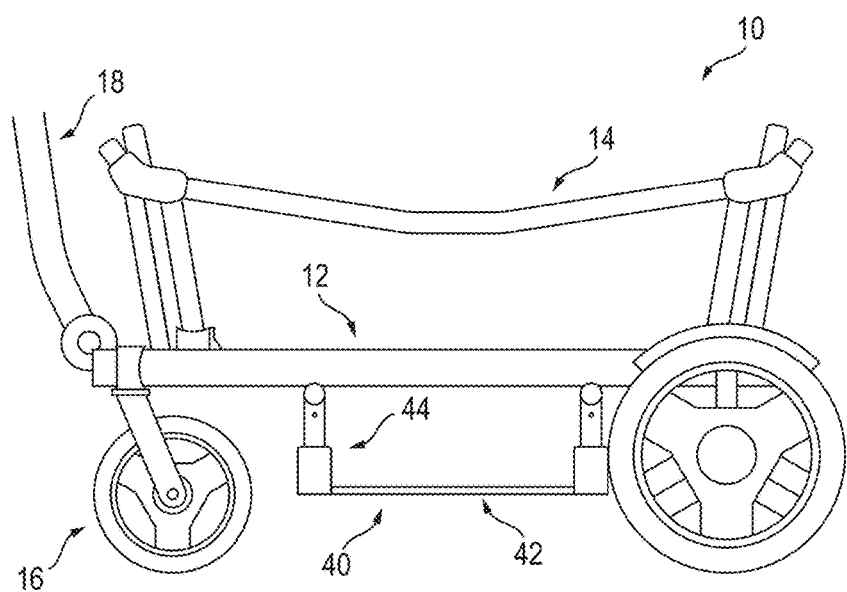
FIGS. 1-17 show a wagon with a collapsible footwell feature according to a first example embodiment of the invention.
Figure 2:
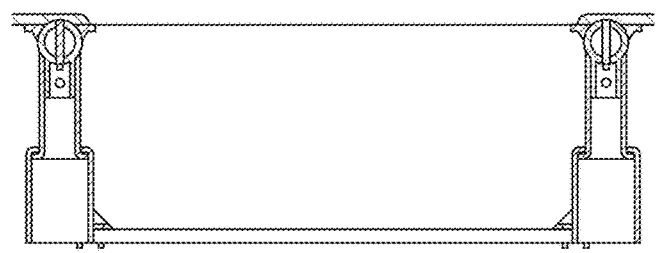
Figure 3:
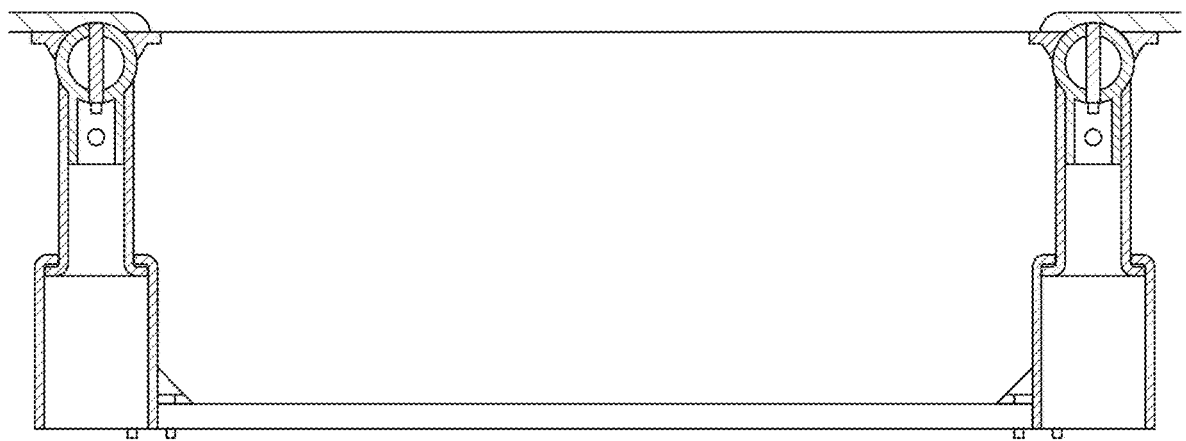
Figure 4:
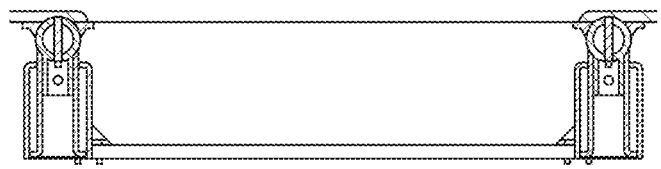
Figure 5:
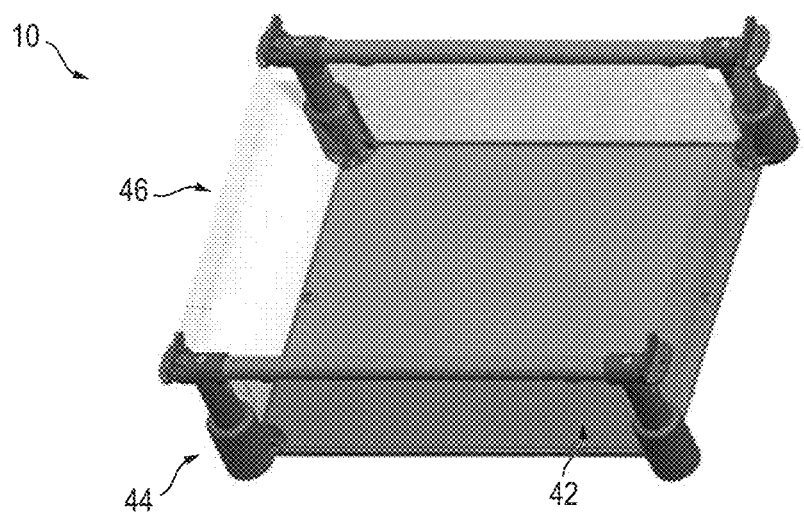
Figure 6:
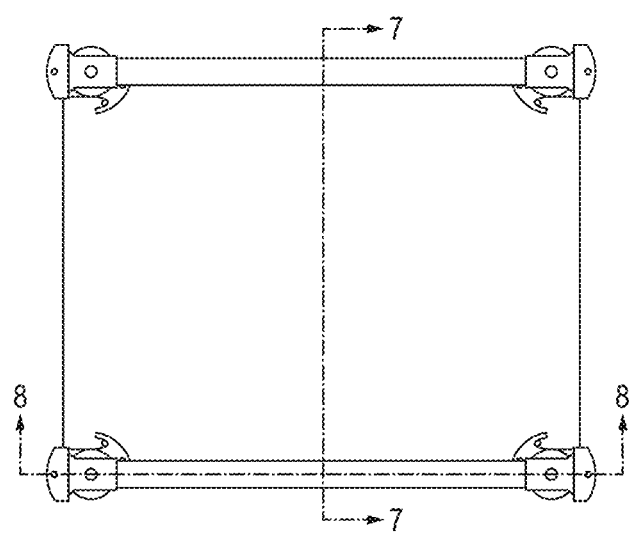
Figure 7:
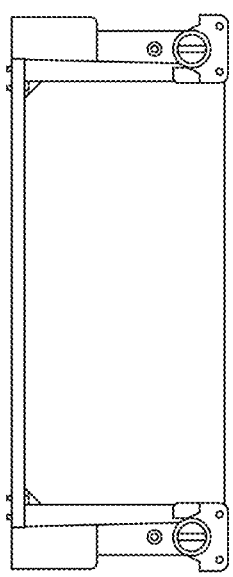
Figure 8:
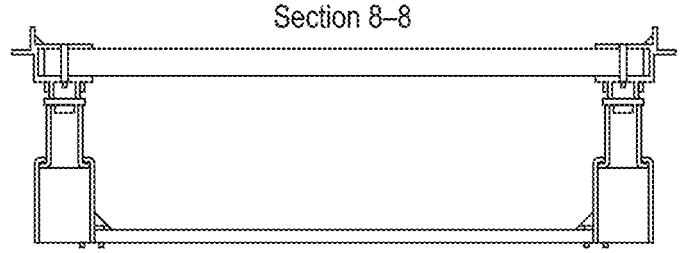
Figure 9:
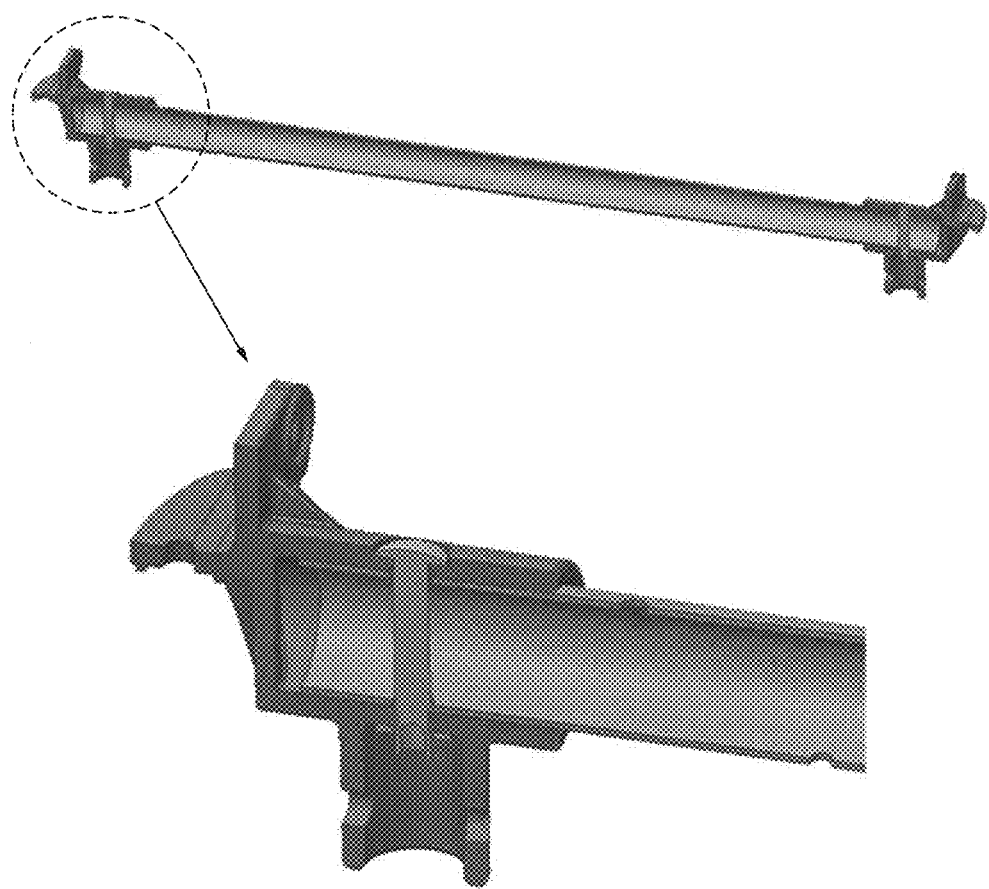
Figure 10:
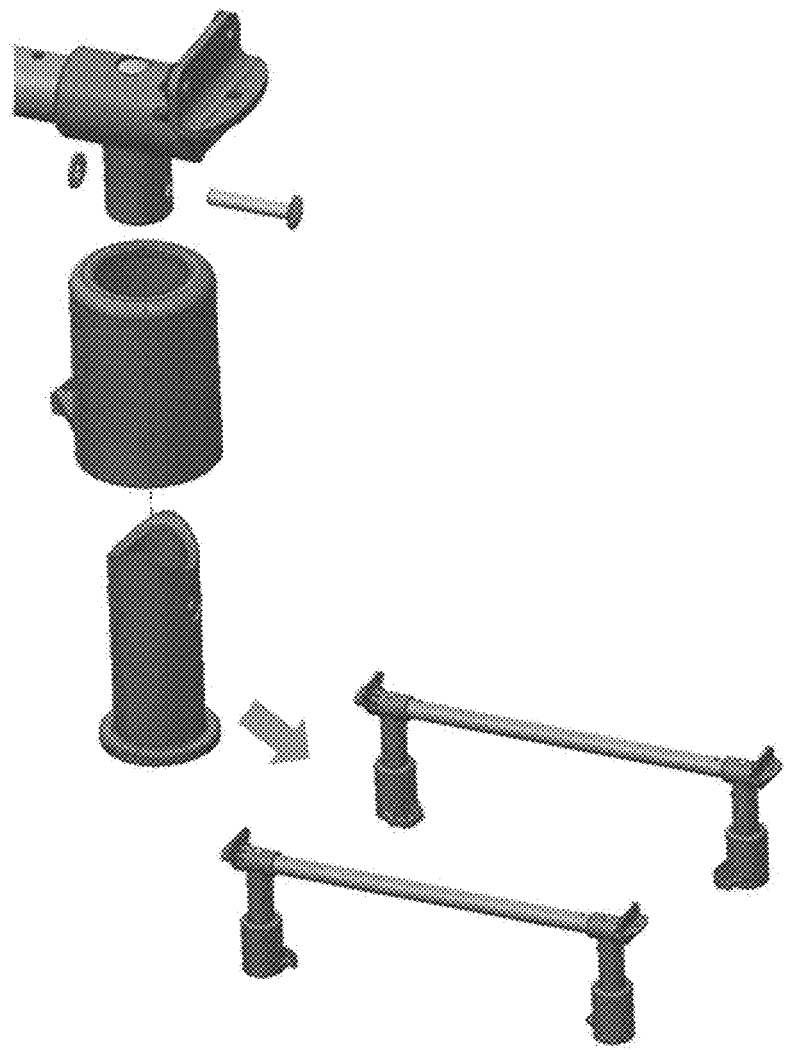
Figure 11:
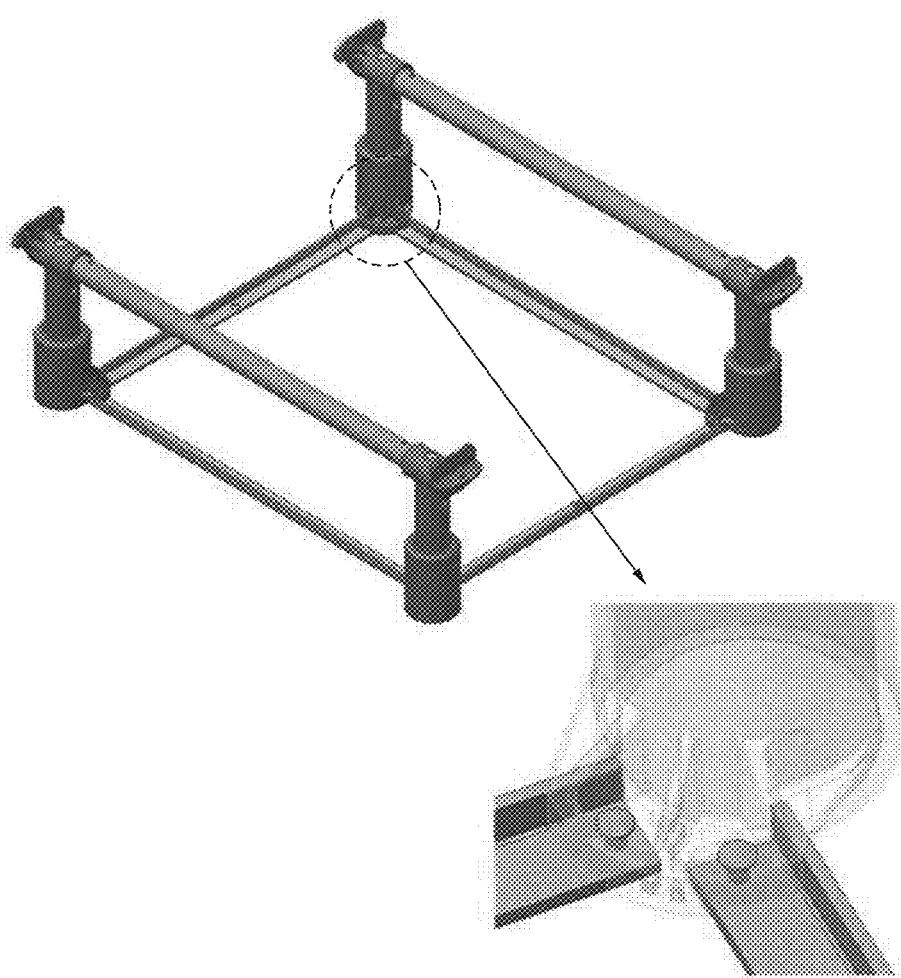
Figure 12:
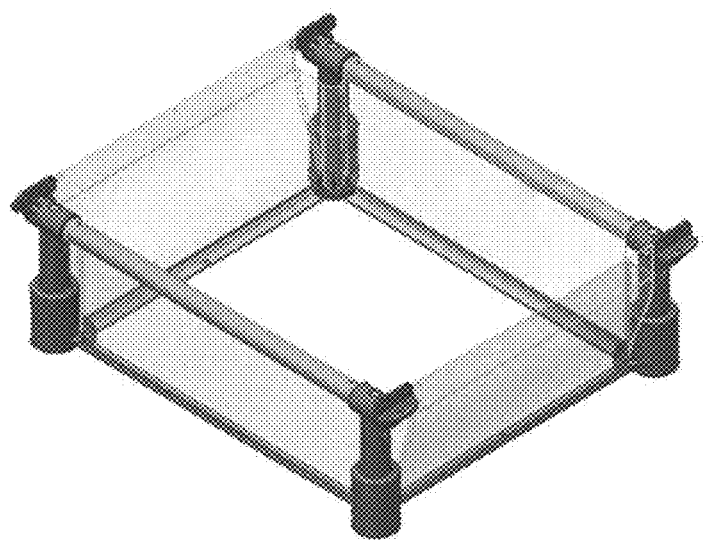
Figure 13:
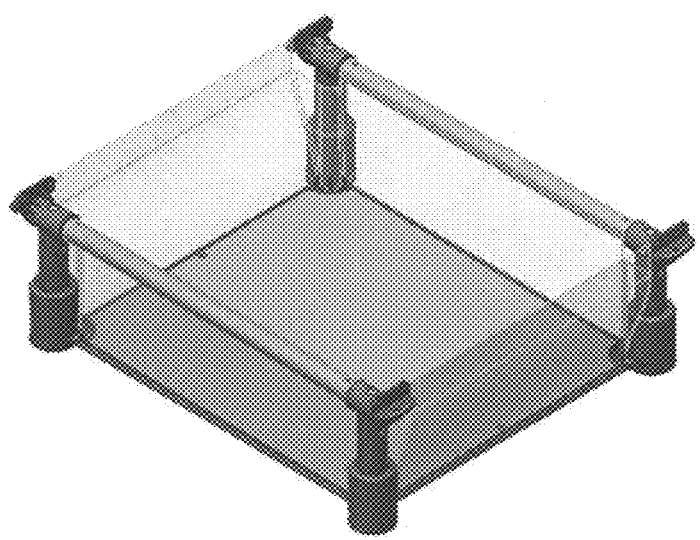
Figure 14:
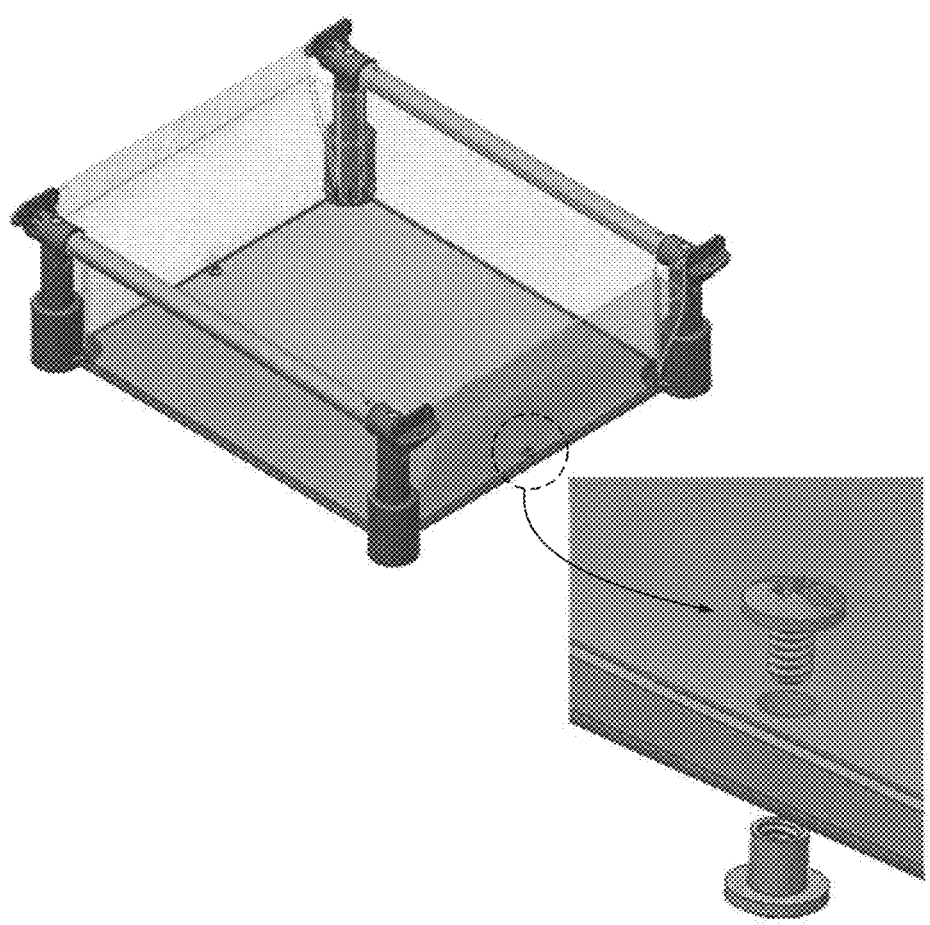
Figure 15:
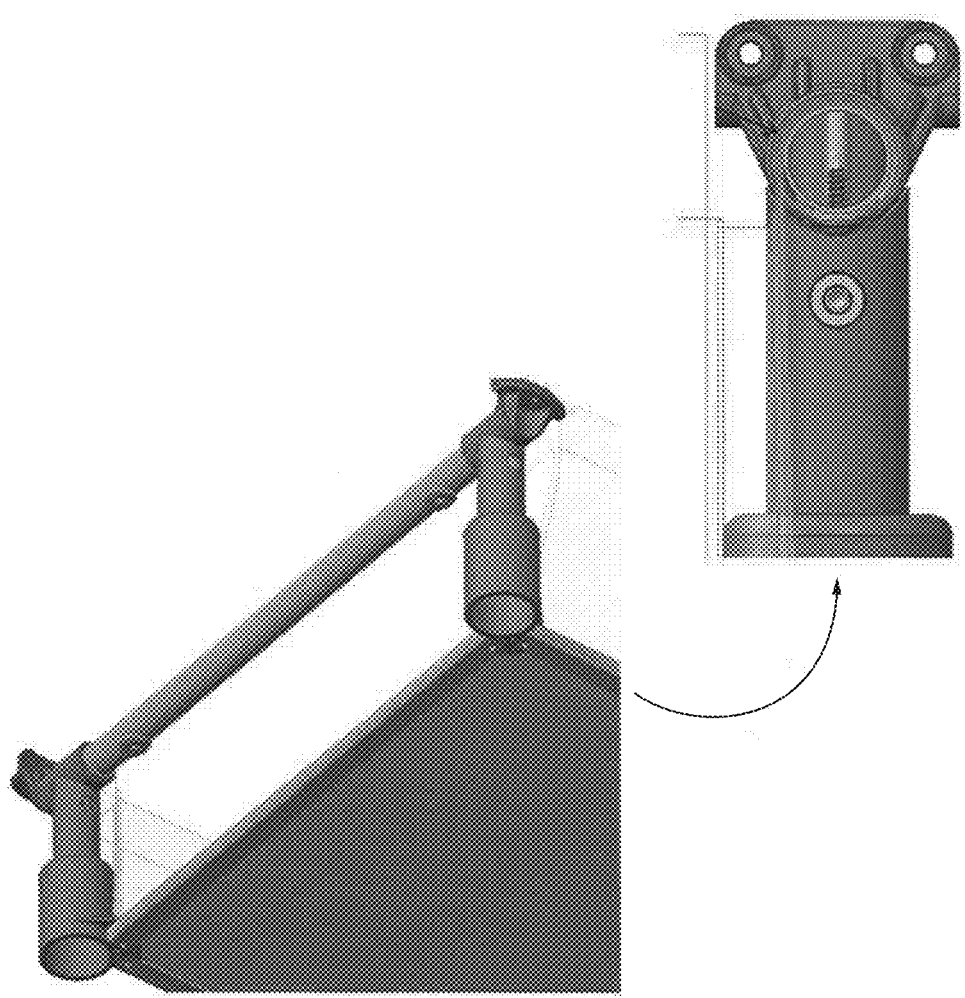
Figure 16A:
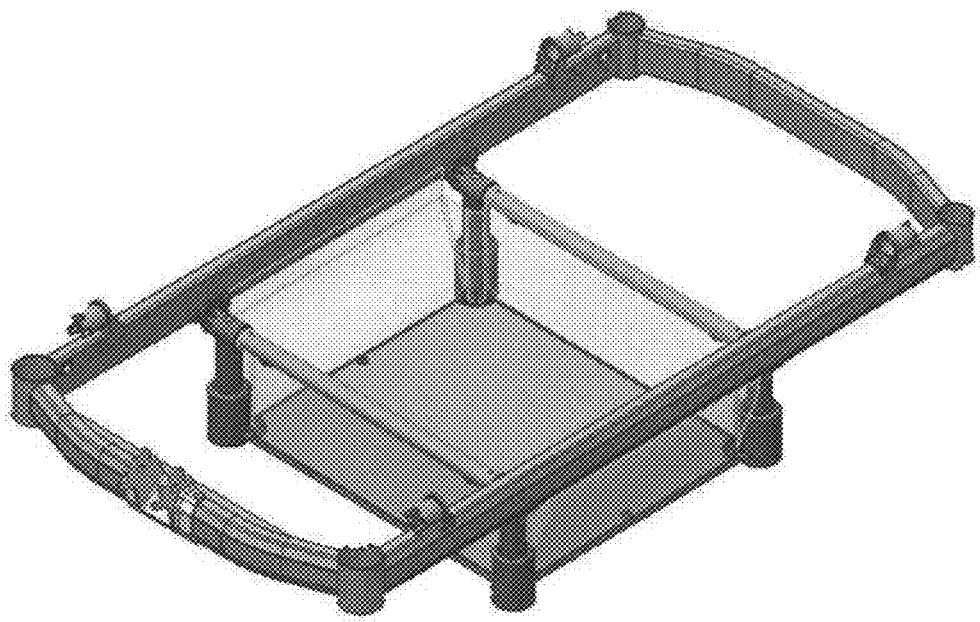
Figure 16B:
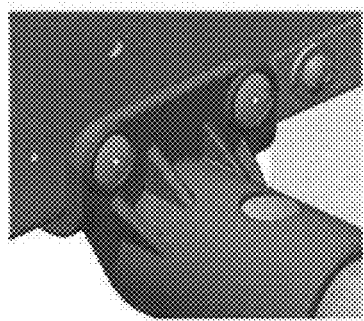
Figure 16C:
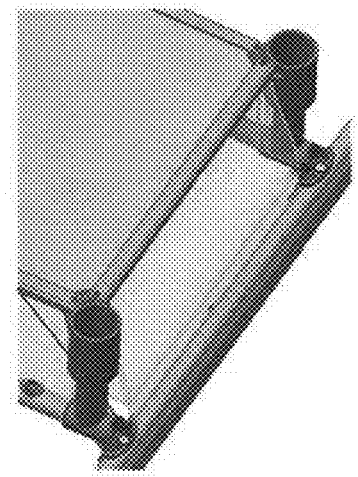
Figure 17:
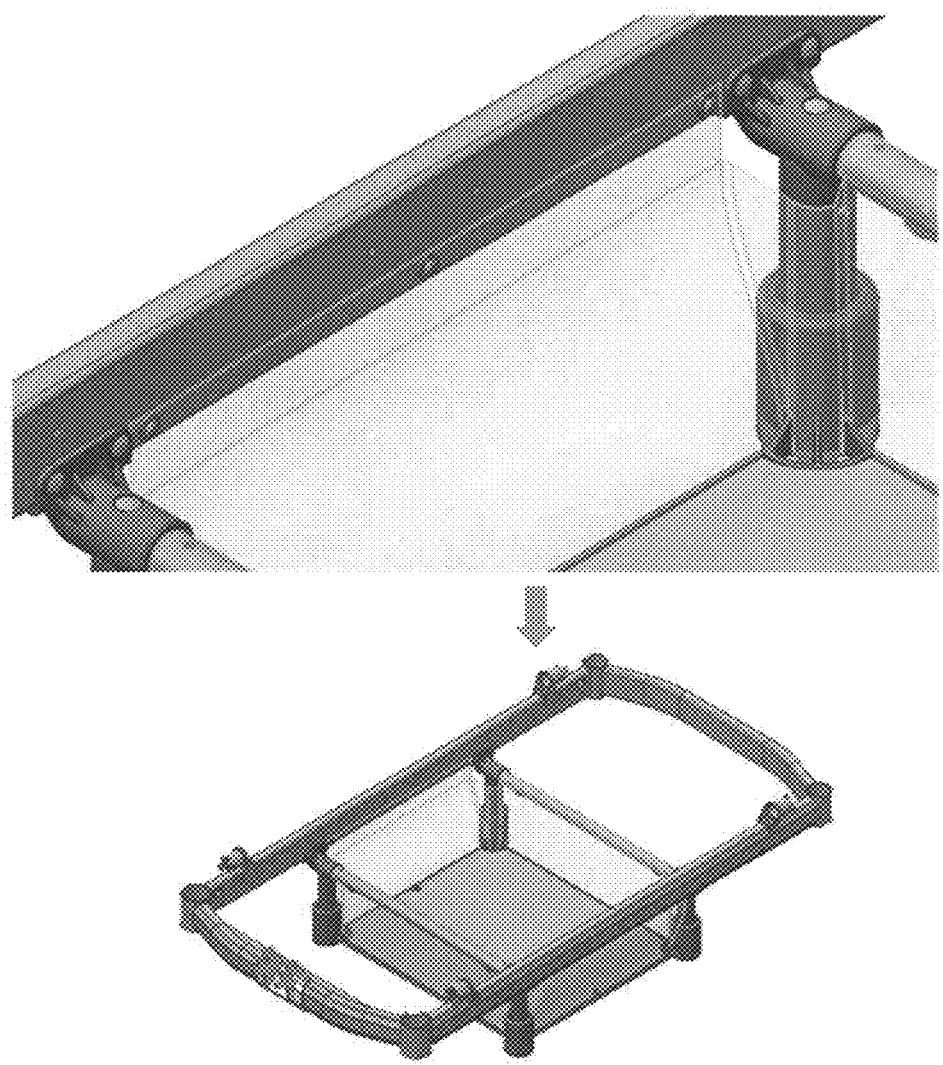

FIGS. 1-17 show a wagon 10 with a collapsible footwell feature 40 according to a first example embodiment of the invention. The wagon 10 includes a base 12, peripheral walls 14 extending upright from the base, wheels 16 supporting and pivotally mounted (directly or indirectly) to the base, and a handle 18 pivotally mounted to the base. For example, the base 12 can include a peripheral frame, and the upright walls 14 can include two opposing sidewalls and two opposing endwalls, with the sidewalls and the endwalls all pivotally mounted at lower portions thereof to the base frame for pivoting from their upright/use position (FIG. 1)

to their collapsed/stored position (not shown) folded down adjacent (i.e., against or closer to) the wagon base. In addition, the upright walls 14 can each include a structural frame (e.g., two outer uprights and an upper connecting member extending therebetween) and soft goods (e.g., fabric sheets) attached to the structural frame to form a contained space within the wagon. The wheels 16 can be displaceable from their use position, for example by being removable from the base, foldable flat to adjacent the base, etc. All of these features of the wagon can be of a conventional type and as such are not described in great detail herein. As an example, these features of the wagon can be of the same type as those described in U.S. Pat. No. 9,108,656, which is hereby incorporated herein by reference.

The collapsible footwell feature 40 includes a footrest 42 and upright elements 44 extending between the wagon base 12 (e.g., base frame) and the footrest. The footwell 40 also includes an opening in the wagon base 12 (e.g., where there is no bottom wall mounted to the base frame), which can have the same shape (e.g., rectangular) and size as the footrest 42 and be aligned directly above the footrest (e.g, generally centrally positioned in the wagon). In this embodiment, the upright elements 44 are provided by telescoping assemblies, for example four telescoping assemblies, with one in each of the four corners of the footrest 42. Each of the telescoping assemblies includes an upper telescoping segment extending downward from the base 12 and a lower telescoping segment extending upward from the footrest 42, aligned with the upper telescoping segment, and telescopingly engaging (e.g., concentrically sliding relative to) the upper telescoping segment. In other embodiments, each telescoping assembly includes more than two concentric telescoping segments, which embodiments can provide an even lower profile/height in the collapsed/stored position. And in other embodiments, each telescoping assembly includes an opening in the base through which extends an upright element with a top that is enlarged (e.g., flanged) so that it cannot fit down through the respective base opening, which embodiments may not provide as low a profile/height in the collapsed/stored position.

The footrest 42 can be provided by a link of a 4-bar linkage, or by a plate, panel, grate, or other rigid member that can support the weight of a child in the wagon 10. A footwell peripheral sidewall 46 (e.g., FIG. 5) of a flexible sheet material (e.g. soft goods such as fabric) can be provided surrounding the footrest 42 (e.g., on all four sides and ends), extending generally vertically between the footrest and the wagon base 12, and defining the footwell interior.

In the depicted embodiment, the footrest 42 drops freely under the force of gravity to the extended/use position, and elevates freely with minimal force into the collapsed/storage position, with no mechanical component(s) to restrict such movement. In other embodiments, lock or retainer mechanisms, which can be of a conventional type known in the art such as spring-biased pushpins, are provided to releasably secure the footrest in either position.

Because of this innovative design, the footwell 40 can be easily repositioned between the extended/use position (FIGS. 1-3) and the collapsed/storage position (FIG. 4) as may be desired for use or for storage/transport as may be desired at the time. In a commercial version of the depicted embodiment, with the wheels 16 (including the vertical supports that removably mount to the base frame) removed and the upright walls 14 folded down (not shown), the overall height of the collapsed wagon 10 is reduced from about 10.25 inches (with the footwell in the extended/use position) to about 8.375 inches (with the footwell in the collapsed/storage position), for a package volume reduction of about 17 percent.

FIGS. 9-17 show an example assembly method of the collapsible footwell 40 of the wagon 10 of the first example embodiment. In addition to showing an example method of assembling this particular footwell embodiment 40, these figures depict additional structural details of the design and construction of this particular footwell embodiment.

Figure 18:
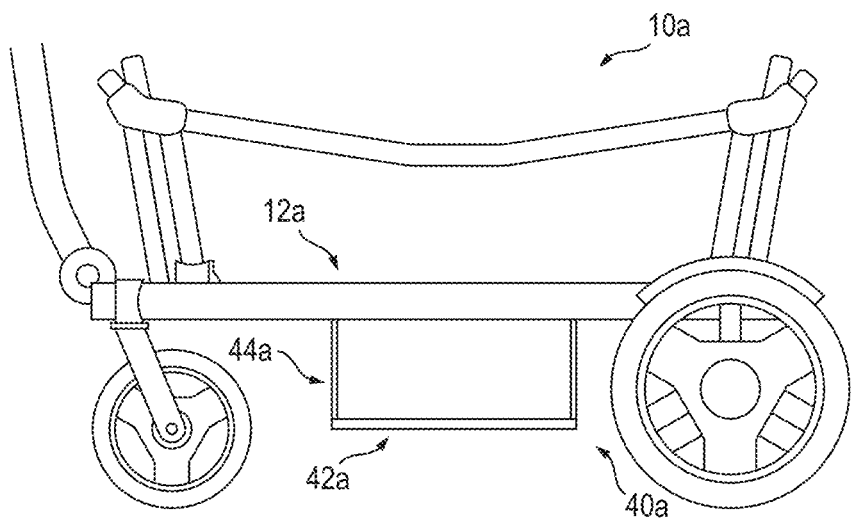
FIGS. 18-20 show a wagon with a collapsible footwell feature according to a second example embodiment of the invention.
Figure 19:
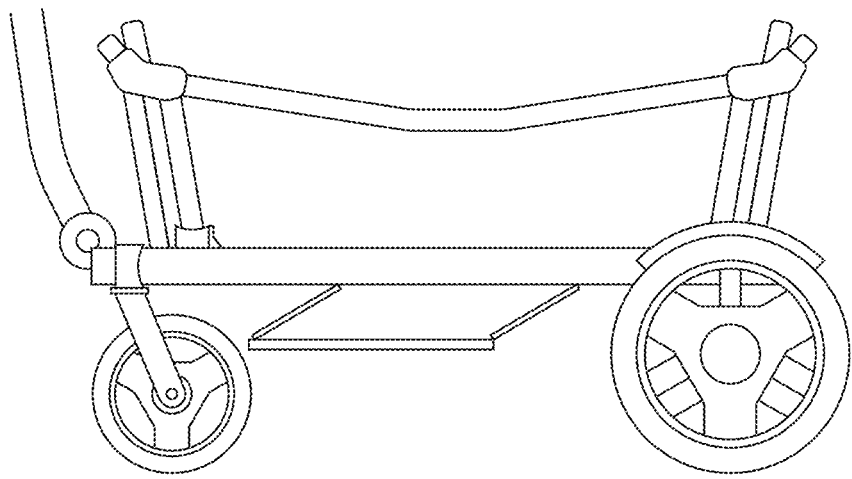
Figure 20:
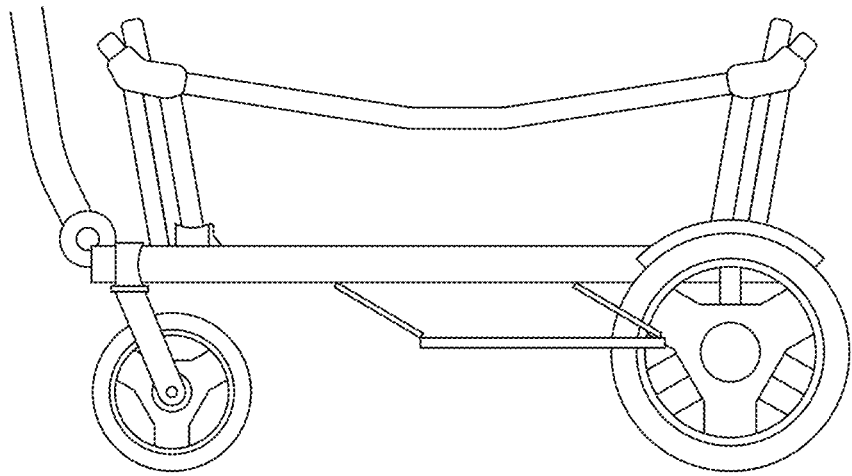

FIGS. 18-20 show a wagon 10*a* with a collapsible footwell feature 40*a* according to a second example embodiment of the invention. The collapsible footwell feature 40*a* of this embodiment is similar to that of the first embodiment in that it includes a footrest 42*a* and upright elements 44*a* extending between the wagon base 12*a* and the footrest. In this embodiment however, the upright elements are provided by at least two upright structural members, one forward and one rearward, that are each pivotally coupled at upper portions to the base and pivotally coupled at lower portions to the footrest. The pivotal couplings can be of a conventional design and assembly. The at least one forward upright structural member can be provided by two tubes, wires, rods, etc. at the two respective forward corners of the footrest, by a plate, panel, lattice, etc. extending laterally across the footrest, or by other conventional structural members, and the same applies to the at least one rearward upright structural member. In this way, the footwell can be collapsed from the extended/use position (FIG. 18) to the collapsed/storage position (FIGS. 19-20) by swinging/pivoting the footrest forward or rearward respectively. Also, a footwell peripheral sidewall (not shown) of soft goods (e.g., fabric) can be provided surrounding the footrest and defining the footwell interior.

Figure 21:
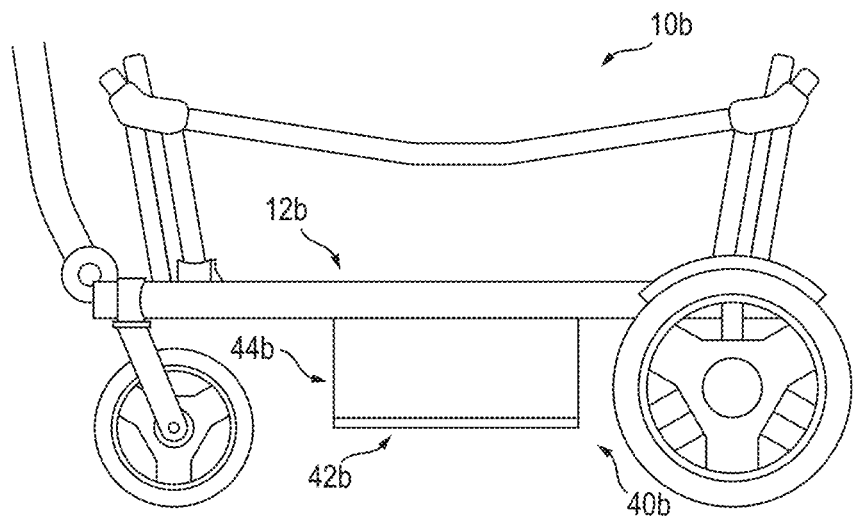
FIGS. 21-22 show a wagon with a collapsible footwell feature according to a third example embodiment of the invention.
Figure 22:
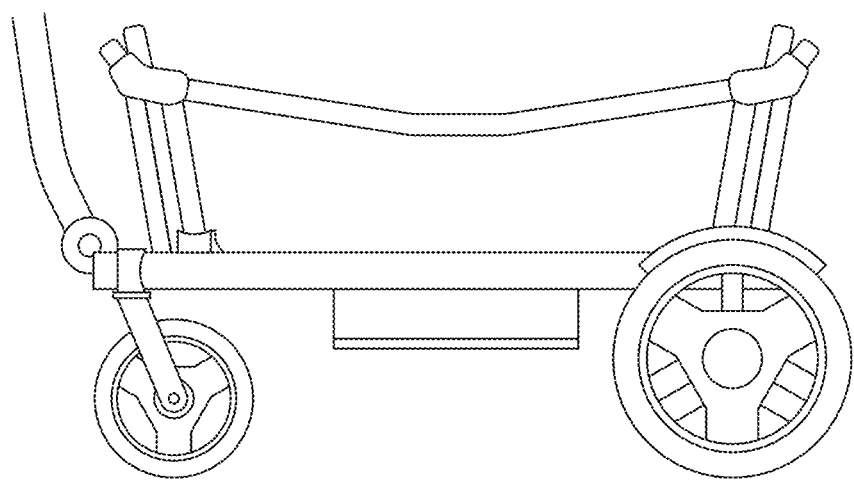

FIGS. 21-22 show a wagon 10*b* with a collapsible footwell feature 40*b* according to a third example embodiment of the invention. The collapsible footwell feature 40*b* of this embodiment is similar to that of the first embodiment in that it includes a footrest 42*b* and upright elements 44*b* extending between the wagon base 12*b* (e.g., a base frame) and the footrest. In this embodiment, however, the upright elements are provided by a sheet of flexible material (e.g., soft goods such as fabric), for example forming a peripheral wall surrounding the footrest and defining the footwell. The fabric peripheral wall is not rigid or structural in the vertical dimension, though it can have peripheral reinforcing elements (e.g., ala an accordion) for holding it shape. The maximum depth of the footwell is thus limited by the installed height of the fabric, so that the fabric limits the maximum depth of the footwell in the extended/use position (FIG. 21) and permits compression of the footwell to the collapsed/storage position (FIG. 22). Depending on the flexible sheet material selected, the footrest in the collapsed/storage position can be elevated/compressed closer to the wagon base frame than is shown in FIG. 22, or even received within and flush with the wagon base.

Figure 23:
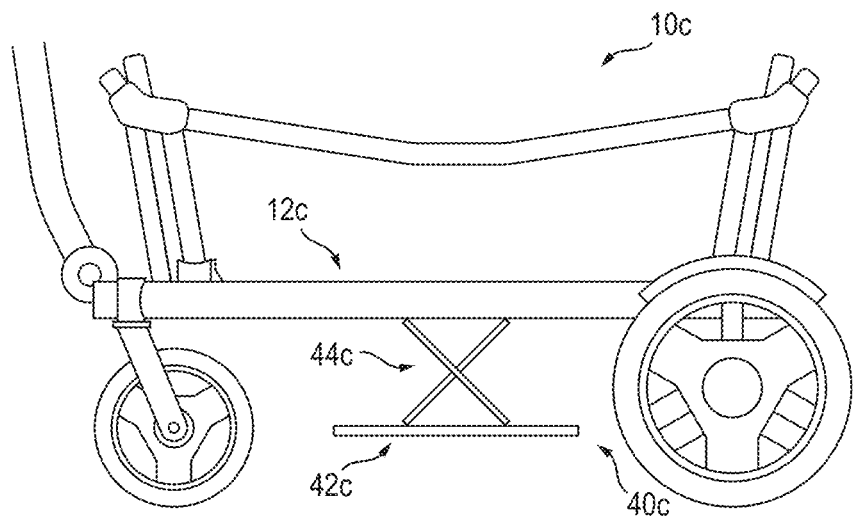
FIGS. 23-24 show a wagon with a collapsible footwell feature according to a fourth example embodiment of the invention.
Figure 24:
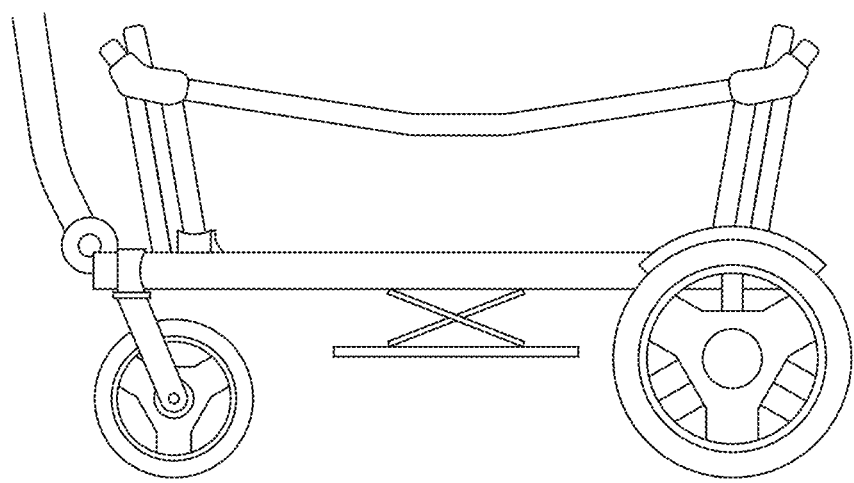

FIGS. 23-24 show a wagon 10*c* with a collapsible footwell feature 40*c* according to a fourth example embodiment of the invention. The collapsible footwell feature 40*c* of this embodiment is similar to that of the first embodiment in that it includes a footrest 42*c* and upright elements 44*c* extending between the wagon base 12*c* (e.g., a base frame) and the footrest. In this embodiment, however, the upright elements are provided by side linkages, for example the depicted X-braces that are each pivotally mounted at upper portions thereof to the wagon base, pivotally mounted at lower portions thereof to the footrest, and pivotally mounted at intermediate portions thereof to each other. The X-braces can be provided by tubes, rods, etc., and the pivotal couplings can be of a conventional design and assembly. In this way, the footwell can be collapsed from the extended/use position (FIG. 23) to the collapsed/storage position (FIG. 24). Also, a footwell peripheral sidewall (not shown) of soft goods (e.g., fabric) can be provided surrounding the footrest and defining the footwell interior.

Figure 25:
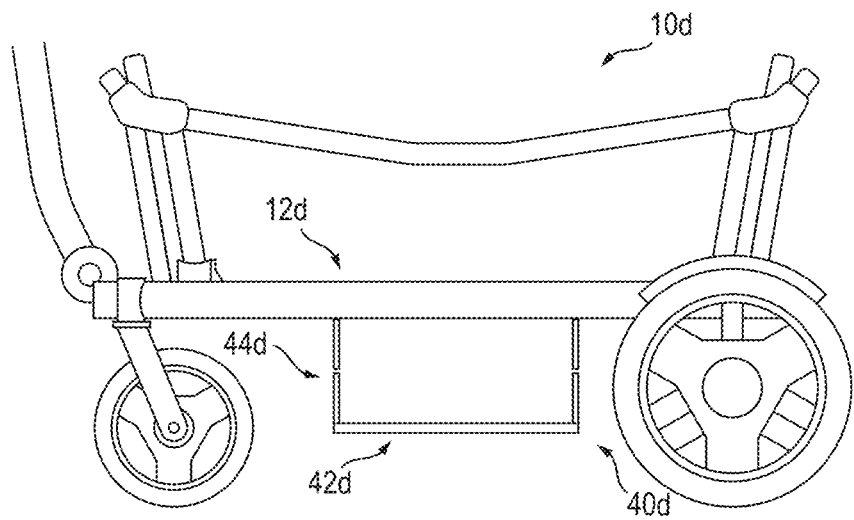
FIGS. 25-26 show a wagon with a collapsible footwell feature according to a fifth example embodiment of the invention.
Figure 26:
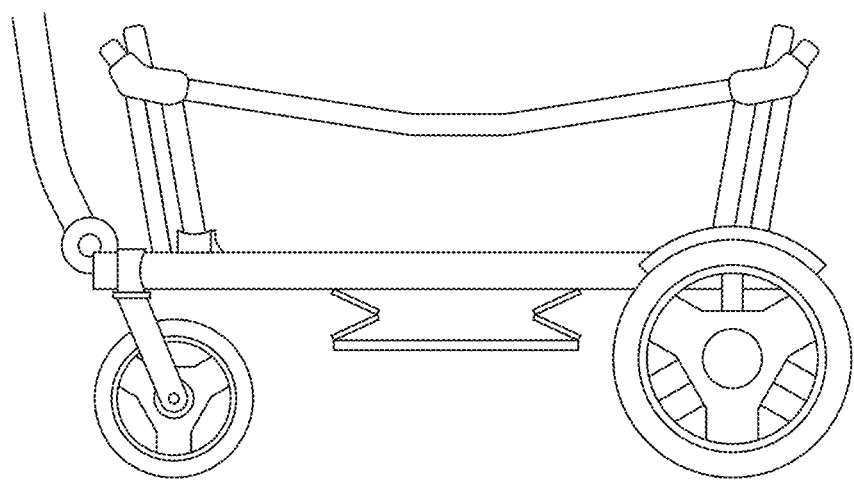

FIGS. 25-26 show a wagon 10d with a collapsible footwell feature 40d according to a fifth example embodiment of the invention. The collapsible footwell feature 40d of this embodiment is similar to that of the first embodiment in that it includes a footrest 42d and upright elements 44d extending between the wagon base 12d (e.g., a base frame) and the footrest. In this embodiment, however, the upright elements are provided by end linkages, for example the depicted forward and rearward end linkages. Each of the linkages includes at least two link segments pivotally coupled together. In the depicted embodiment, each end linkage includes two link segments pivotally coupled together with the upper link segment pivotally coupled at its top to the wagon base and with the lower link segment pivotally coupled at its bottom to the footrest, though in other embodiments more than two link segments can be provided in each in the linkage. The link segments can be provided by tubes, bars, rods, panels, etc., and the pivotal couplings can be of a conventional type. The at least one forward linkage can be provided by two forward linkages at the respective two forward corners of the footrest, by a plate, panel, lattice, etc. extending laterally across the footrest, or by other conventional structural linkages, and the same applies to the at least one rearward linkage. In this way, the footwell can be collapsed from the extended/use position (FIG. 25) to the collapsed/storage position (FIG. 26). Also, a footwell peripheral sidewall (not shown) of soft goods (e.g., fabric) can be provided surrounding the footrest and defining the footwell interior.

In other embodiments not depicted herein but contemplated by the invention, other conventional linkage systems can be implemented extending between and interconnecting the wagon base and the footrest to permit the footrest to compress, fold, slide, screw, or otherwise collapse from its extended/use position to its/storage position closer to the wagon base.

Turning now to the position-locking handle feature, on a typical wagon the handle is free to rotate about its axis until its movement is limited by the wagon geometry or the ground. But on the wagon of the present invention, the handle locks in one or more positions. Locking handle design options include automatic lock or only when intentioned by the user.

FIGS. 27-42 show the wagon 10 with a position-locking handle feature 70 according to a sixth example embodiment of the invention. The wagon 10 can be of the same type as that described above or it can be a different style of wagon. As such, the wagon 10 includes a base 12, peripheral walls 14, wheels 16, and a handle 18, and further details of the design and construction are not described herein for brevity.

The position-lockable handle 70 includes a handle 18, a pivot-lock mechanism 72, and a lock-release mechanism 74. The pivot-lock mechanism 72 pivotally attaches the handle 18 at a lower portion thereof to the wagon (e.g., at the front of the base) 12 to permit the handle to travel through a pivotal path in a vertical plane, and releasably locks the handle in multiple discrete predefined positions of its pivotal path. The lock-release mechanism 74 can be manually actuated to engage and reposition the pivot-lock mechanism 72 from its locked position to its released position to release the handle to travel through its pivotal path.

Figure 27:
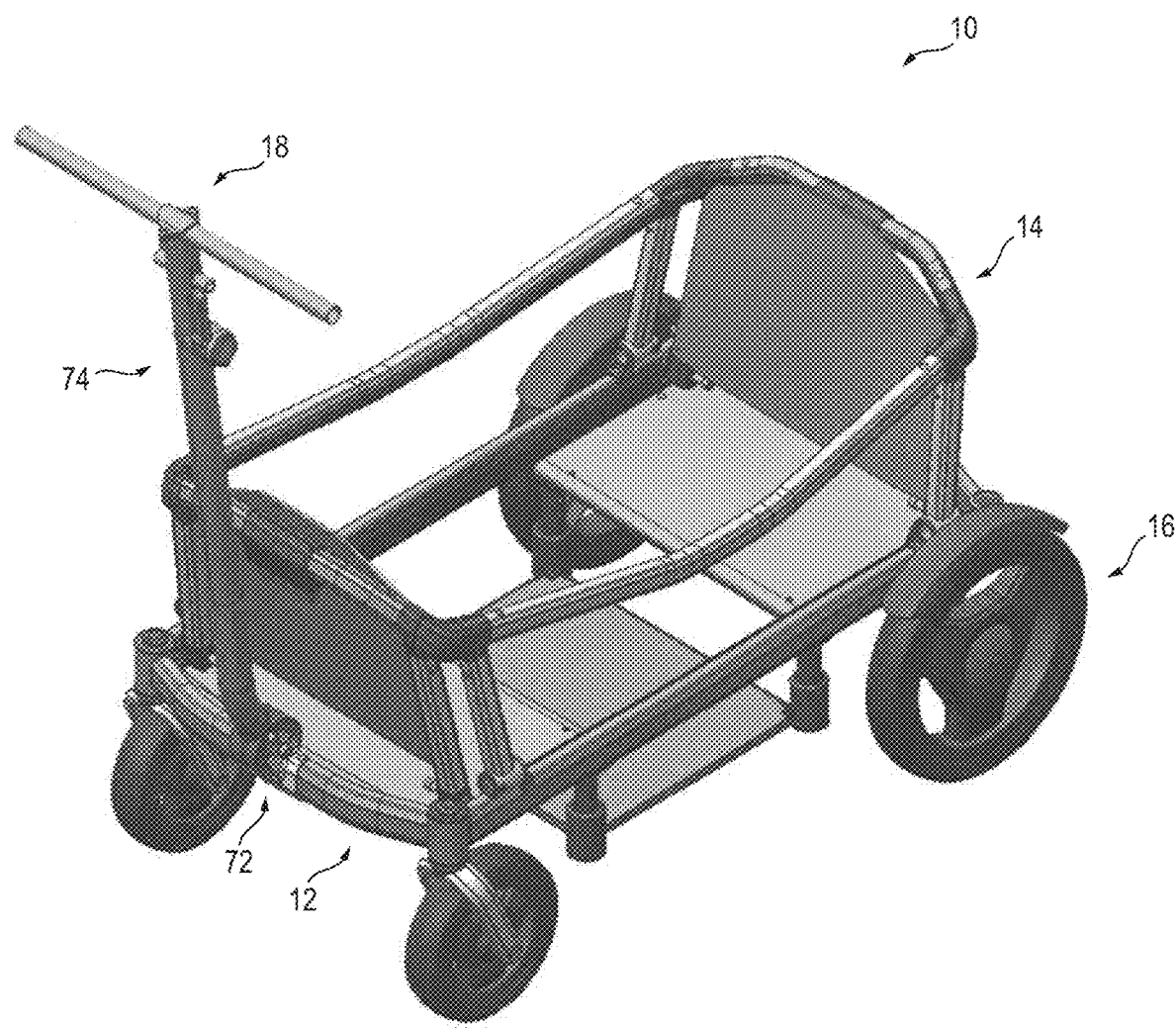
Figure 28:
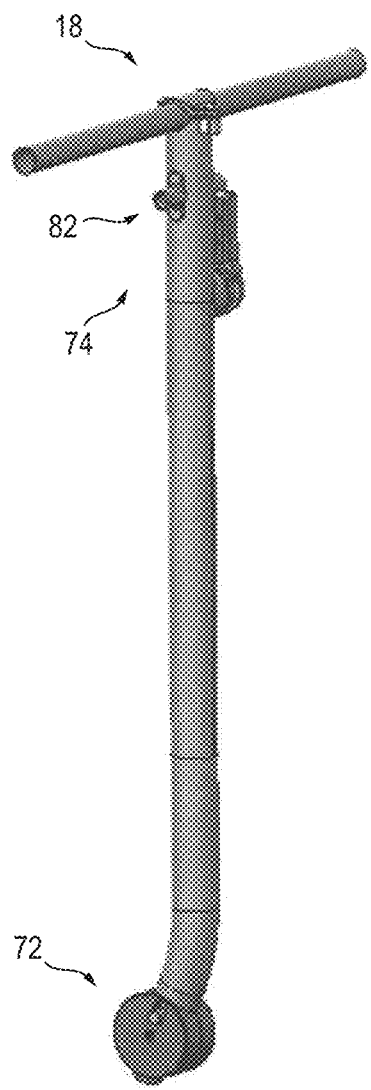
Figure 31:
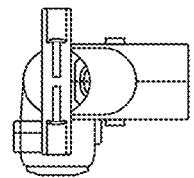
Figure 32:
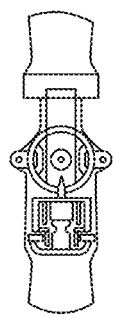
Figure 33:
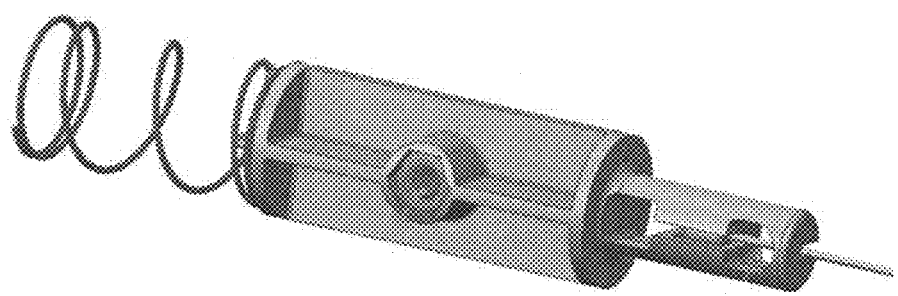
Figure 34A:
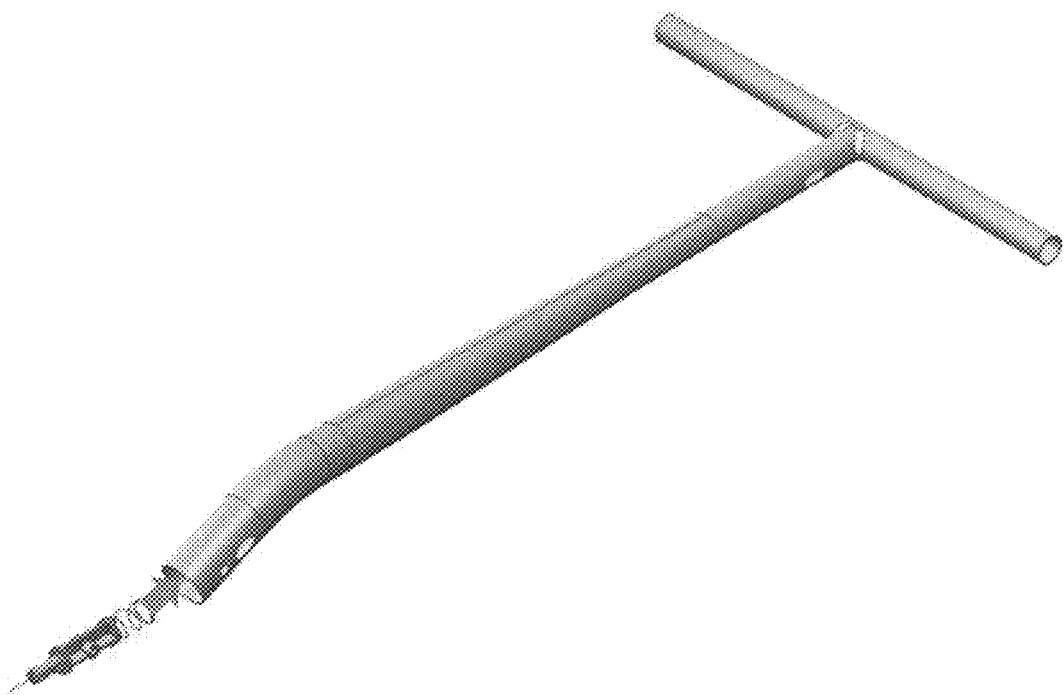
Figure 34B:
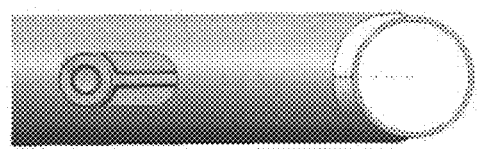
Figure 35:
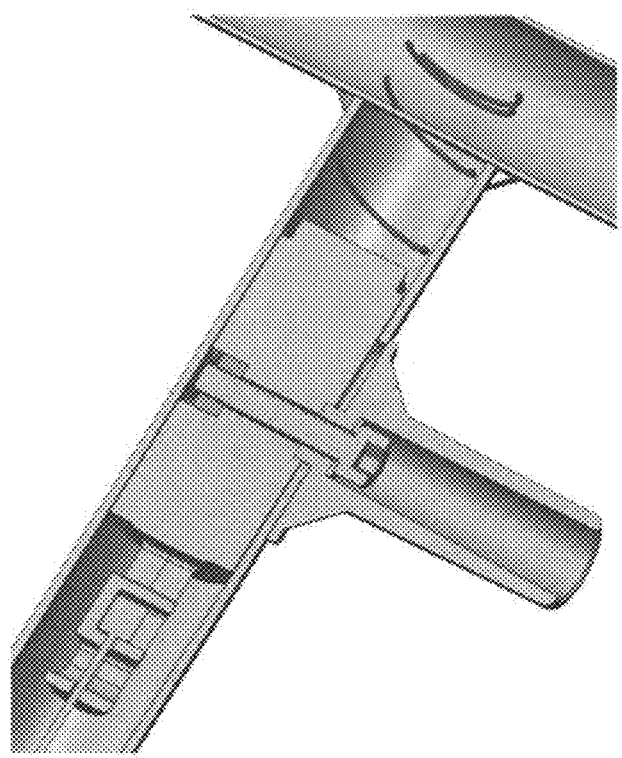
Figure 36:
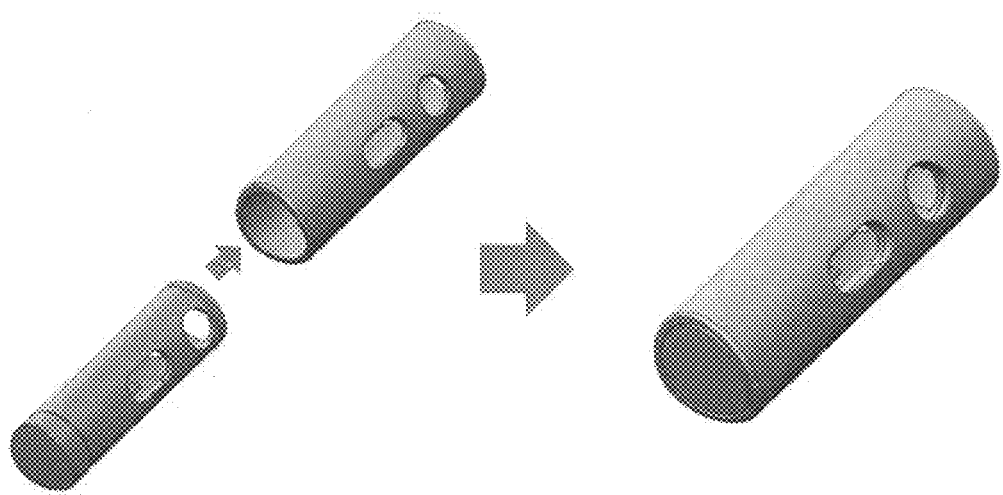
Figure 37:
Figure 38:
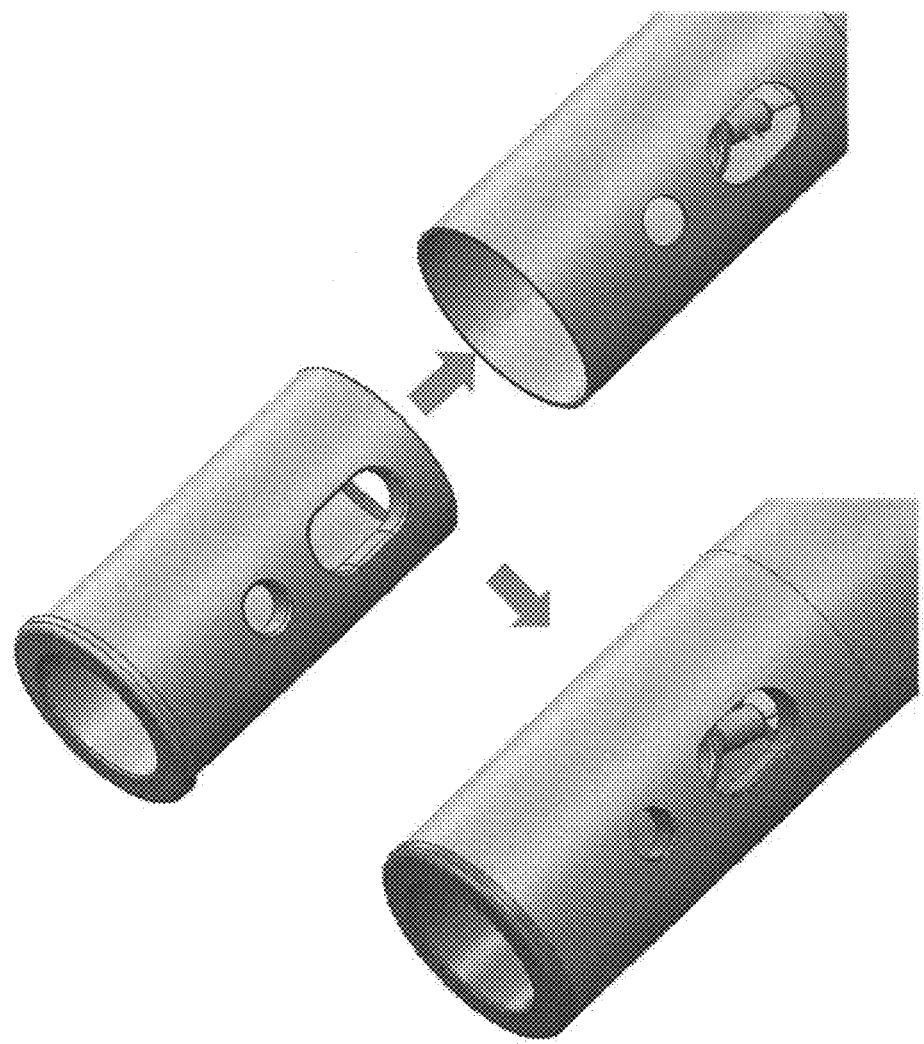
Figure 39:
Figures 40A, 40B:
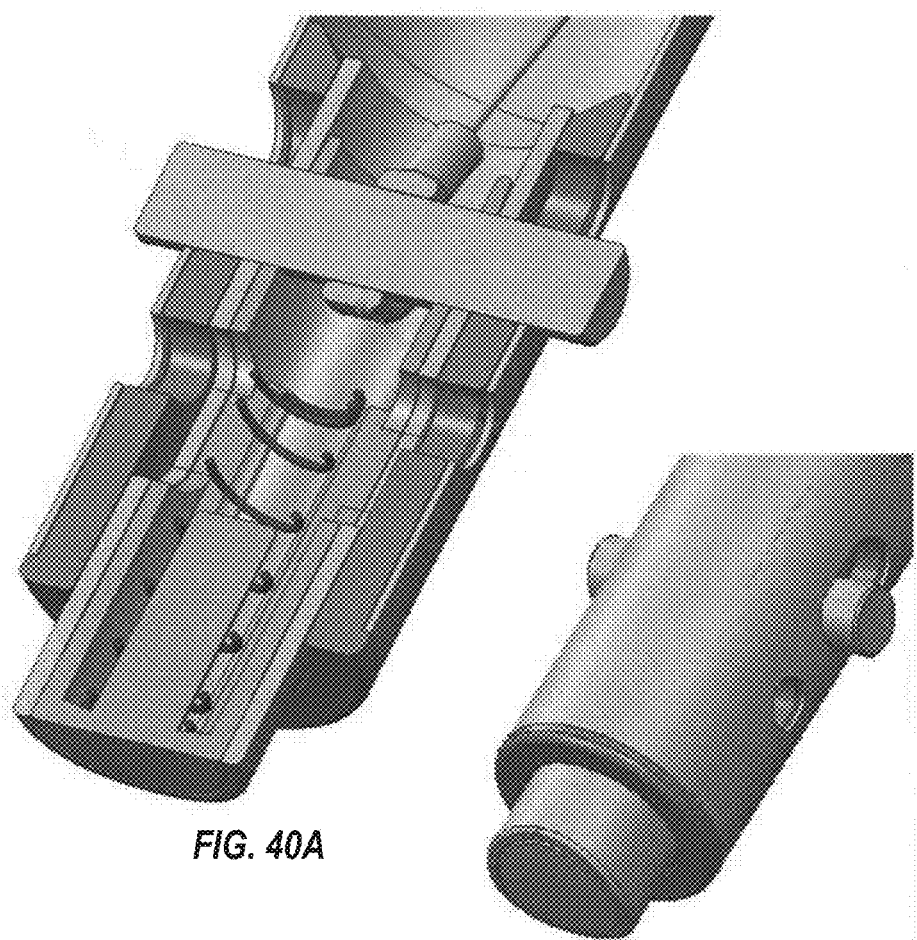
Figure 41A:
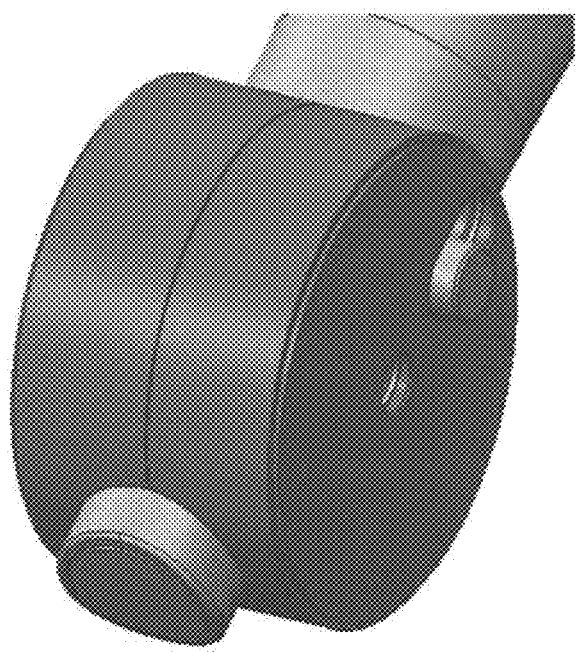
Figure 41B:
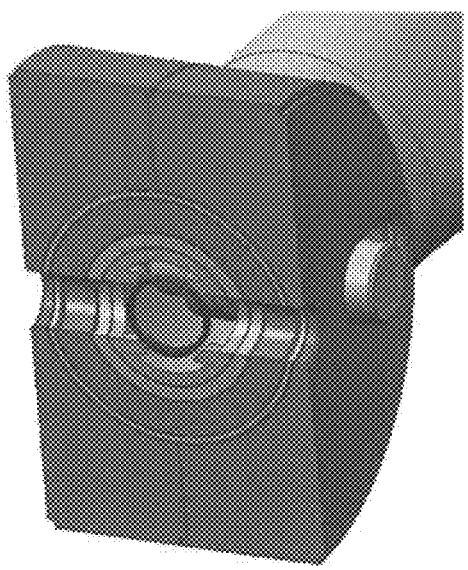
Figure 42:
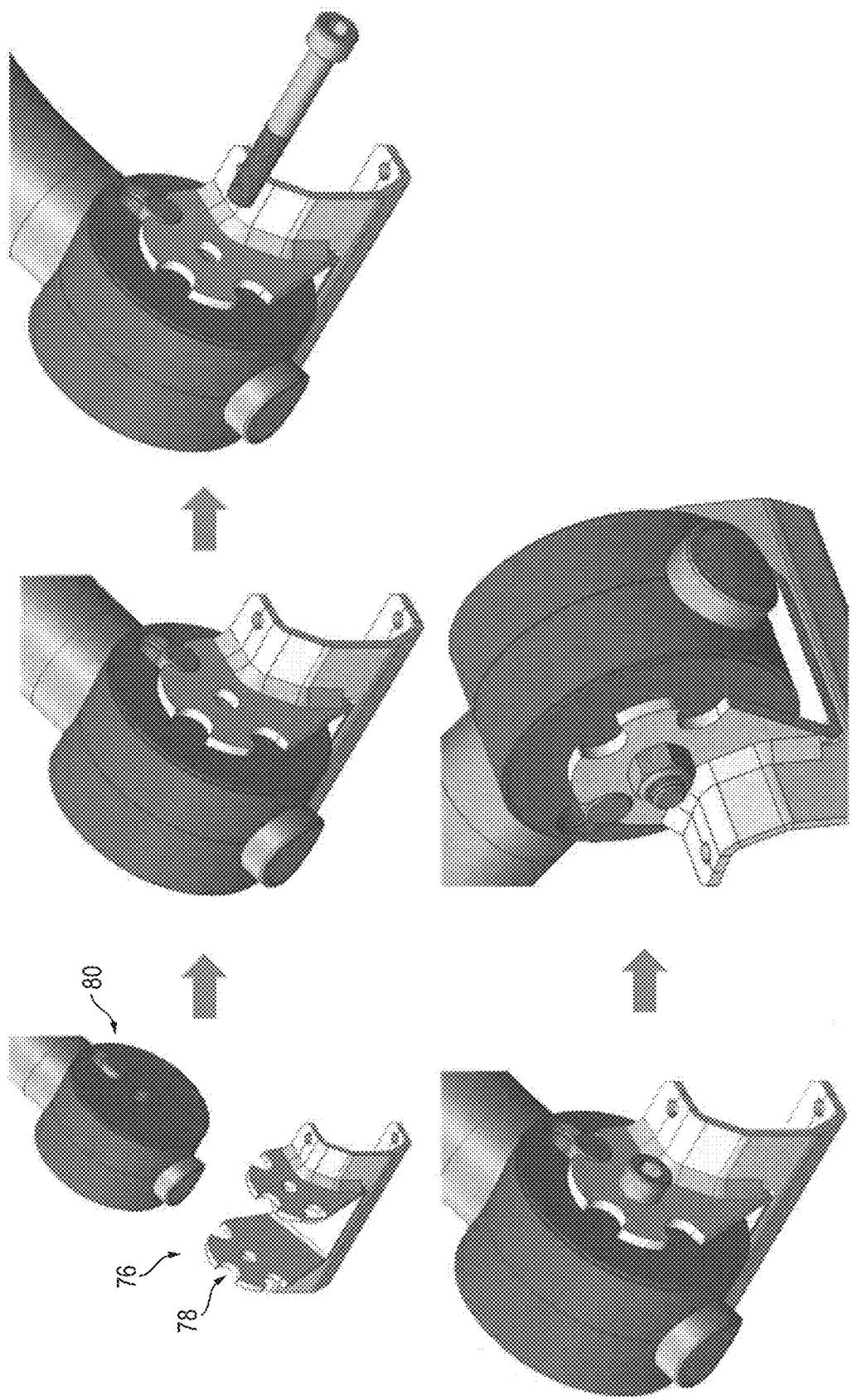

In the depicted embodiment, the pivot-lock mechanism 72 locks the handle in a "stowed" position folded backward/down onto the base in a compact arrangement for storage and/or transport (not shown), a "down" position folded forward/down but away from the base in an extended arrangement for pulling the wagon 10 (not shown), and an "upright" position between the stowed and down positions (FIG. 27). In other embodiments, the pivot-lock mechanism locks the handle in more, fewer, and or other positions. In some embodiments, the pivot-lock mechanism includes a manual lock that is operable to manually engage interlocking parts of the pivot-lock mechanism to permit the handle to be selectively locked the multiple positions only when manually actuated, and in some embodiments the lock-release mechanism includes an automatic release that is operable to automatically disengage the pivot-lock mechanism.

In typical embodiments of the pivot-lock mechanism 72 (see FIGS. 27 and 42), it includes a position-defining member 76 mounted to the wagon, for example the depicted two semicircular mounting brackets 76 that are mounted to the wagon base front in a spaced apart relationship, that have the handle 18 pivotally mounted to and between them, that each define multiple serial lock notches 78, and that are arranged so that corresponding lock notches on each bracket are in lateral alignment. In addition, the pivot-lock mechanism 72 includes at least one lock protrusion 80 that is movably mounted to the handle 18 and that releasably engages the position-defining member 76, for example the depicted two pins extending outwardly from opposite sides of the handle and receivable in sequential pairs of the lock notches 78. The rearmost notches 78 define the stowed position, the forward most notches define the down position, and the intermediate notches define the upright position. The lock protrusions 80 are spring-biased into their locking position in which they can engage one set of the aligned notches 78, and can be withdrawn from notch engagement against the spring force into their release position. In the depicted embodiment, the lock protrusions 80 move generally radially relative to the positioning bracket 76 between the locking and release positions, though in other embodiments they can move axially into and out of the notches.

And the lock-release mechanism 74 of the depicted embodiment (see FIGS. 27-31) includes a release actuator 82 that is operably coupled (e.g., by a cable) to the locking protrusion 80 (e.g., to an internal body from which the actual protrusion extends outwardly from). The release actuator 82 moves between a locked position and a release position, and is biased toward the locked position by its connection to the spring-biased locking protrusion 80. In this way, moving the release actuator 82 from its locked position to its released position causes the lock protrusion 82 correspondingly move from its locked position to its released position so that it is disengaged from the notches 78 and thus the handle 18 is free to pivot through its travel path. In other embodiments, the release actuator moves axially, rotationally, helically, or in another manner to disengage the locking protrusion. And in other embodiments, the lock-release mechanism disengages the pivot-lock mechanism by another type of actuator (e.g., a foot pedal), by a certain movement of the handle (e.g., lateral), or by another structure.

In this way, the handle 18 locks into a position automatically (under the spring influence) when the handle is placed into one of the preset locking positions. The upright position places the handle in an easily accessible position, the stowed position locks the handle in a folded position (folded over the wagon side walls) locking the wagon side walls in a folded condition, and in the down position the handle range of motion is limited to prevent the handle from contacting the ground.

Advantages of this innovation include that locking the handle 18 in the upright position eliminates the possibility of the handle resting against a seat back of the wagon 10. Thus, if the user pushes against the handle 18 (towards the body of the wagon 10) when the handle is in the upright position, the load will not be transferred into the seat back. This is particularly important if the seat back folds. Also, locking the handle 18 in the upright position places the handle in an ideal position for pushing the wagon 10.

In addition, locking the handle 18 in the down position prevents it from contacting the ground, places the handle in a more easily accessible location (reduces and/or eliminates the need to bend over to grab the handle), and prevents the handle from being damaged from rubbing rough surfaces (e.g. the ground).

Furthermore, in the stowed position the handle 18 is folded down over the folded wagon peripheral walls and can be locked in place thereby acting as a storage latch to prevent unintentional unfolding of the wagon peripheral walls.

In other embodiments, the handle does not lock automatically. Instead, the user must manually lock the handle into a fixed position. And in other embodiments, the pivot lock mechanism provides no discrete lock positions (e.g. no lock notches), so the user can manually position and secure the handle and any desired position in the pivotal travel path of the handle.

FIGS. 33-42 show an example assembly method of the position-lockable handle 70 of the wagon 10 of the sixth example embodiment. In addition to showing an example method of assembling this particular handle embodiment 70, these figures depict additional structural details of the design and construction of this particular handle embodiment.

Figure 43:
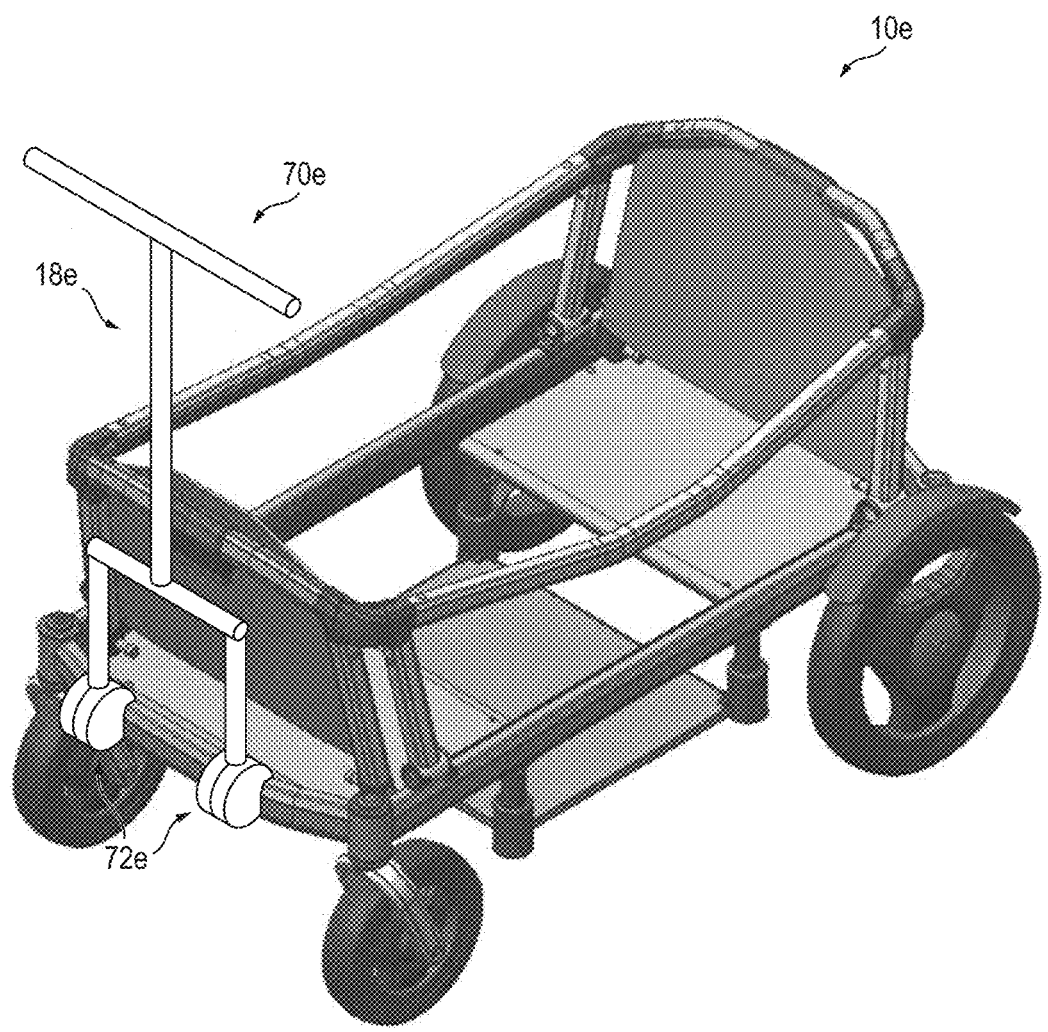
FIG. 43 shows a wagon with a position-lockable handle according to a seventh example embodiment of the invention.

FIG. 43 shows a wagon 10e with a position-lockable handle 70e according to a seventh example embodiment of the invention. The position-lockable handle 70e of this embodiment is similar to that of the sixth embodiment in that it includes a handle 18e, a pivot-lock mechanism 72e, and a lock-release mechanism (not shown). In this embodiment, however, the handle 18e is forked at its bottom and includes two of the pivot-lock mechanisms 72e to spread the load and facilitate a smooth pivoting motion. The lock-release mechanism can be of the same type is that described above.

Figure 44:
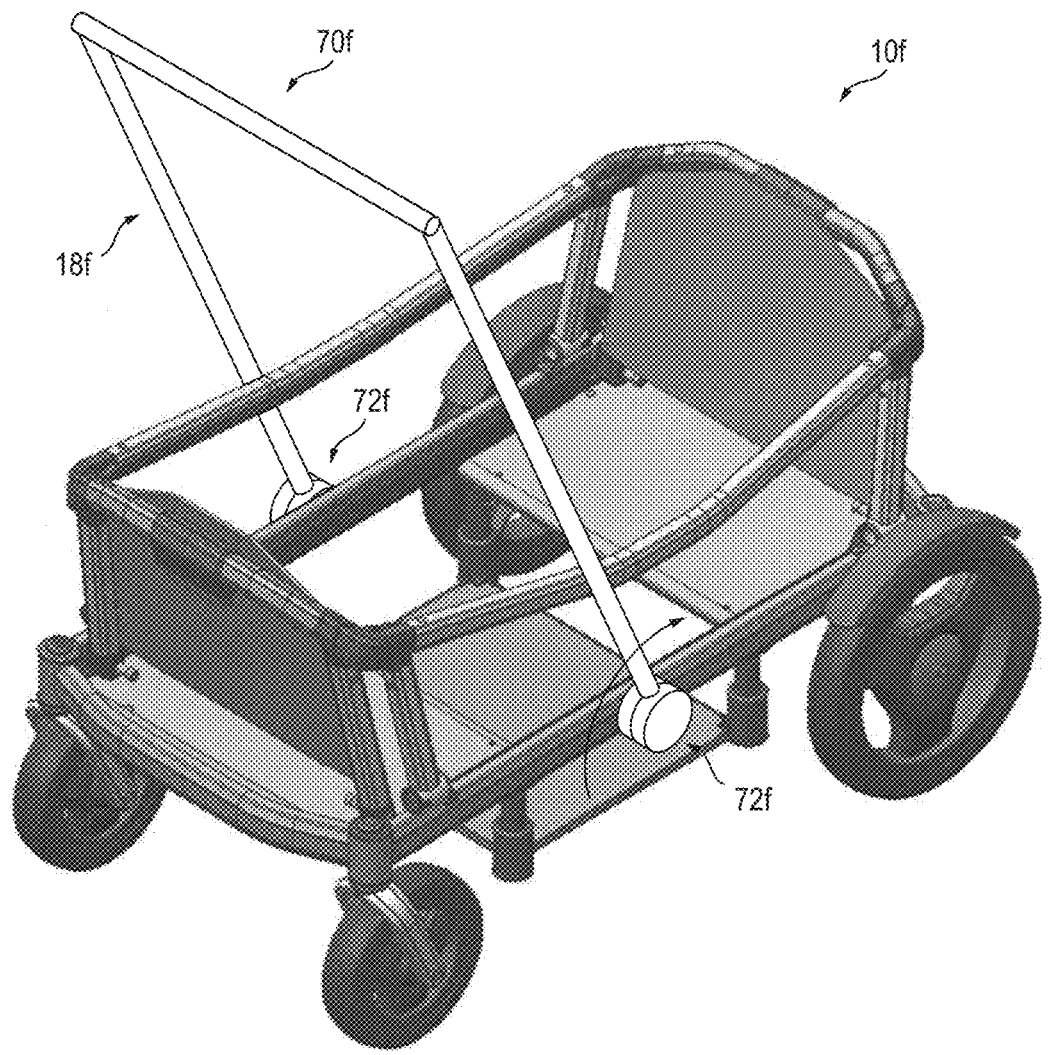
FIG. 44 shows a wagon with a position-lockable handle according to an eighth example embodiment of the invention.
Figure 45:
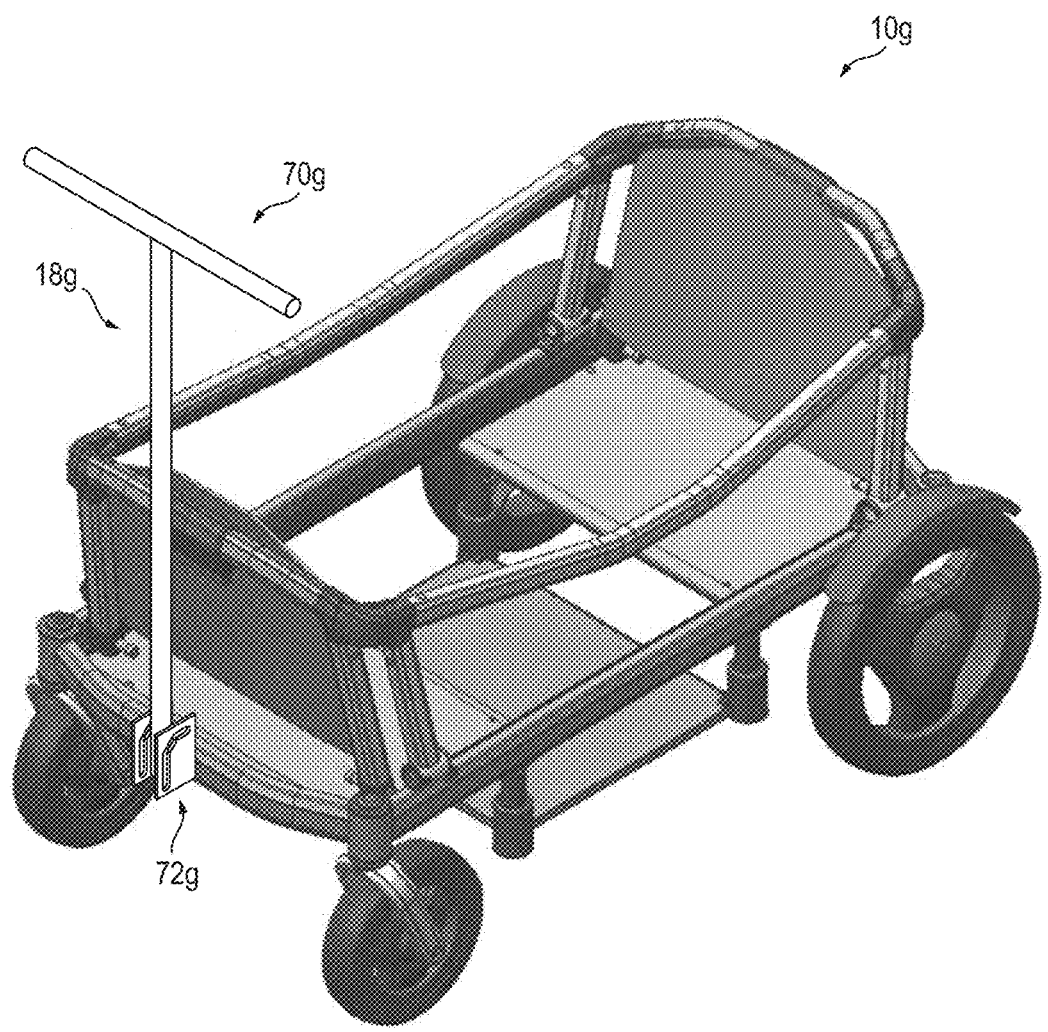
FIGS. 45-48 show a wagon with a position-lockable handle according to a ninth example embodiment of the invention.
Figure 46:
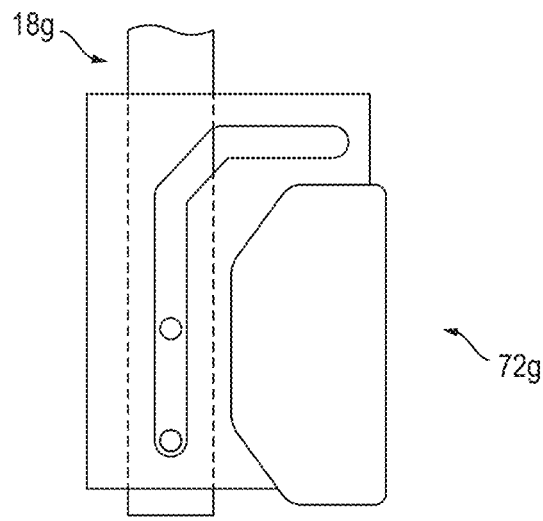
Figure 47:
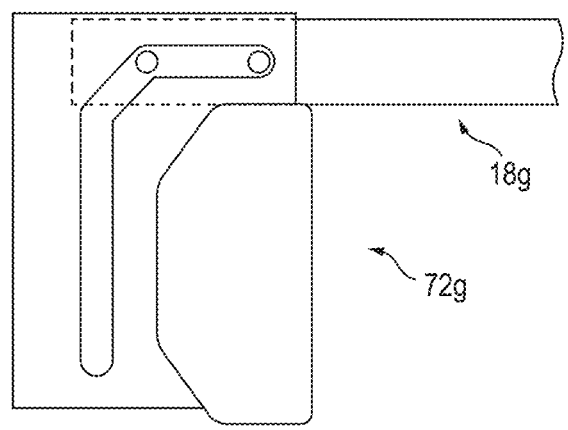
Figure 48:
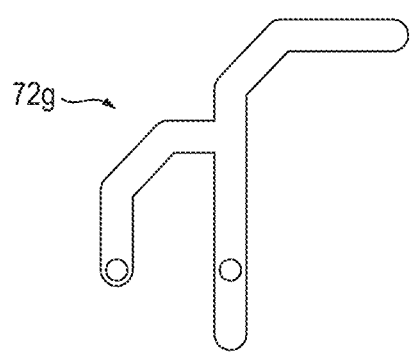

FIG. 44 shows a wagon 10f with a position-lockable handle 70f according to an eighth example embodiment of the invention. The position-lockable handle 70f of this embodiment is similar to that of the seventh embodiment in that it includes a handle 18e with two ends and with two pivot-lock mechanisms 72e mounting the handle ends to the base, and a lock-release mechanism (not shown). In this embodiment, however, the handle 18e is U-shaped, pivotally mounts to the wagon base at the middle of its sides, and has a length that is greater than one half of the base link, so that the pivotal travel of the handle is not limited by the front end wall of the wagon in its upright use position, and instead the handle can be swung over/around the upright walls through at least a 180° pivotal path for positioning at either end of the wagon and pulling the wagon from either end. The lock-release mechanism can be of the same type is that described above.

FIGS. 45-48 show a wagon 10g with a position-lockable handle 70g according to a ninth example embodiment of the invention. The position-lockable handle 70g of this embodiment is similar to that of the sixth embodiment in that it includes a handle 18g, a pivot-lock mechanism 72g, and a lock-release mechanism (not shown). In this embodiment, however, the pivot-lock mechanism 72g includes at least one elongated guide track (e.g., a slot or channel formed in an inner wall of a plate or housing mounted to the wagon base) and at least one follower member (e.g., two spaced-apart pins extending outward from a bottom portion of the handle 18g and received and guided by the track). The handle 18g does not pivot about an axis, but instead the pin(s) slide within the slot(s) to permit folding and "locking" into one of multiple positions. The lock-release mechanism can be of the same type is that described above.

Figure 49:
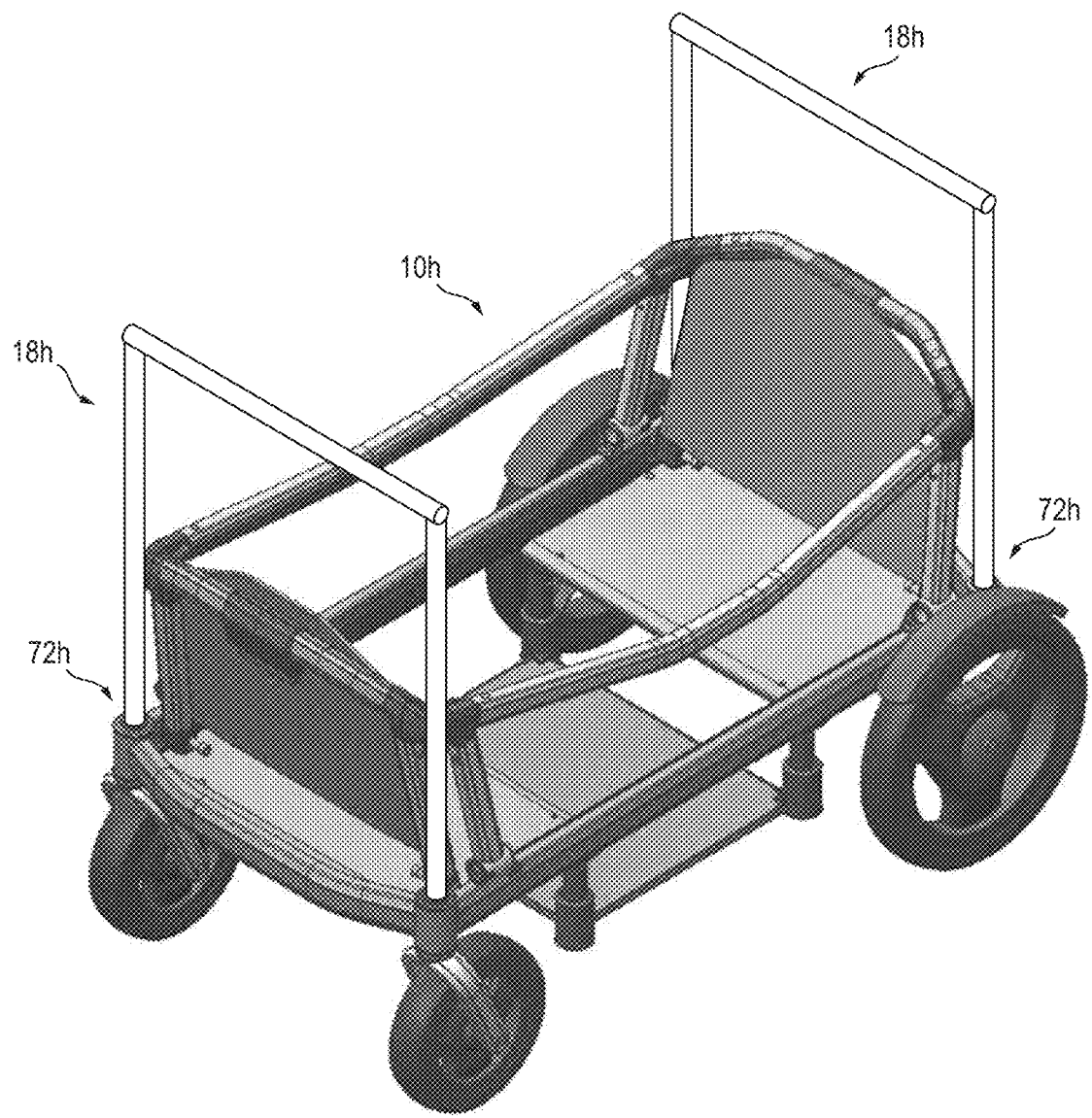
FIG. 49 shows a wagon with a position-lockable handle according to a tenth example embodiment of the invention.

FIG. 49 shows a wagon 10h with a position-lockable handle 70h according to a tenth example embodiment of the invention. The position-lockable handle 70h of this embodiment is similar to that of the sixth embodiment in that it includes a handle 18h, a pivot-lock mechanism 72h, and a lock-release mechanism (not shown). In this embodiment, however, the pivot-lock mechanism 72h removably mounts onto the wagon base, for example the bottom end of the handle tube 18h can lock into a receiver on the wagon frame. Pivotal articulation of the handle 18h can be incorporated into the handle end or the base receiver. Removable mounts can be provided at each end of the wagon base and two of the handles 18h provided, with the handles interchangeably mountable in the removable mount(s) at each end of the wagon base. The handles 18h can be generally U-shaped each with two mounting ends, and the removable mounts can be provided at the corners of the wagon, as depicted. The lock-release mechanism can be of the same type is that described above, or it can be provided by a detent connection between the handle and the wagon base that assists gravity in retaining the handle connection to the wagon during use but they can be overcome by applying an upward force.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A wagon, comprising:
   a first end wall and a second end wall, wherein the first and second end walls are substantially parallel and wherein at least one of the first end wall or second end wall is positionable in a use position and in a second position different from the use position;
   a first side wall and a second side wall, wherein the first and second side walls are substantially parallel, and wherein the first and second end walls and the first and second side walls together with a bottom surface collectively define a container;
a plurality of wheels;
a handle having first and second lateral portions and a central portion extending between the first and second lateral portions, wherein the first and second lateral portions and the central portion together define a U-shaped handle,
wherein the handle is positionable in a first position in which a handle lock mechanism locks the handle in the first position,
wherein the handle is positionable in a second position to facilitate pulling the wagon in which the handle lock mechanism is disengaged to permit the handle to rotate about at least one pivot point in the second position, and
wherein at least a portion of the handle extends beyond the first end wall of the wagon when in the second position, and wherein the handle is pivotable such that the handle is positionable wherein at least a portion of the handle extends beyond the second end wall.

2. The wagon of claim 1, wherein the handle lock mechanism is an automatic handle lock mechanism that automatically locks the handle in the first position.

3. The wagon of claim 1, wherein the at least one pivot point includes a pair of pivot points where the first and second lateral portions of the handle are pivotable about the pair of pivot points.

4. A wagon, comprising:
at least one peripheral wall, the at least one peripheral wall including a first end wall and a second end wall;
a bottom surface coupled to the at least one peripheral wall, together the bottom surface and the at least one peripheral wall form a container;
a footwell extending from a portion of the bottom surface; and
a handle that is positionable in (a) a first position in which the handle is locked in the first position via a locking mechanism, and (b) a second position in which the handle is moveable about at least one pivot point to facilitate pulling the wagon, wherein at least a portion of the handle extends beyond the first end wall of the wagon when in the second position, and wherein the handle is positionable such that at least a portion of the handle extends beyond the second end wall.

5. The wagon of claim 4, wherein the locking mechanism is an automatic locking mechanism that automatically locks the handle in the first position.

6. The wagon of claim 4, further comprising a lock-release mechanism having a locked position and a released position, wherein in the released position the
handle is moveable from the first position to another position.

7. The wagon of claim 6, wherein the lock-release mechanism is biased toward the locked position.

8. The wagon of claim 4, wherein the handle is further positionable in a storage position.

9. The wagon of claim 4, wherein the footwell includes a footrest that is connected to at least one footwell sidewall.

10. The wagon of claim 4, wherein the footwell is positionable in an extended position and a storage position in which the footwell is compressed such that it is closer to the bottom surface than in the extended position.

11. The wagon of claim 9, wherein the at least one footwell sidewall is made of a fabric material.

12. The wagon of claim 4, wherein the footwell is positioned between a first seat and a second seat of the wagon.

13. The wagon of claim 4, wherein at least a portion of the at least one peripheral wall is repositionable between an erected position and a storage position.

14. The wagon of claim 13, wherein the portion of the at least one peripheral wall that is repositionable is rotatable about at least one pivot point between the erected position and the storage position.

15. The wagon of claim 4, wherein at least one of the first end wall or the second end wall is repositionable between an erected position and a storage position.

16. The wagon of claim 4, wherein the handle has first and second lateral portions and a central portion extending between the first and second lateral portions, wherein the first and second lateral portions and the central portion together define a U-shaped handle.

17. The wagon of claim 16, further comprising a pair of pivot points where the first and second lateral portions of the handle are pivotally mounted to the wagon.

18. The wagon of claim 17, wherein the pair of pivot points for the handle are located near the second end wall.

19. The wagon of claim 3, wherein the pair of pivot points for the handle are located near the second end wall of the container.

20. The wagon of claim 1, wherein the handle is movable from the first position to the second position by rotating the handle about the at least one pivot point.

21. The wagon of claim 1, wherein the handle extends beyond the second end wall in the first position in which the handle lock mechanism locks the handle in the first position to facilitate pushing the wagon.

22. The wagon of claim 4, wherein in the first position in which the locking mechanism locks the handle in the first position to facilitate pushing the wagon the handle extends beyond the second end wall of the wagon.

23. A wagon, comprising:
at least one sidewall positionable in a use position and in a second position different from the use position;
a bottom surface, wherein the at least one sidewall and the bottom surface together define a container;
a footwell extending below a bottom surface of the container;
a plurality of wheels removably coupleable to the wagon; and
a handle positionable in a first position in which a handle lock mechanism locks the handle in the first position,
wherein the handle is positionable in a second position to facilitate pulling the wagon in which the handle lock mechanism is disengaged to permit the handle to rotate about a pivot point in the second position,
wherein the handle lock mechanism is an automatic handle lock mechanism for automatically locking the handle in the first position.

24. The wagon of claim 23, wherein the handle is substantially vertical in the first position.

25. The wagon of claim 23, wherein the handle is positionable in a third position that differs from the first position and the second position.

26. The wagon of claim 25, wherein the handle lock mechanism is an automatic handle lock mechanism for automatically locking the handle in the third position.

27. The wagon of claim 23, further comprising a pivot mechanism that defines the pivot point, wherein the handle lock mechanism is integrated with the pivot mechanism to form a pivot-lock mechanism that both pivotally connects the handle to the wagon and locks the handle in the first position.

28. The wagon of claim 27, wherein the handle lock mechanism includes a position-defining member that defines multiple serial lock notches.

29. The wagon of claim 28, wherein the handle lock mechanism includes at least one lock protrusion that is movably mounted to the handle and that releasably engages the position-defining member.

30. The wagon of claim 23, wherein each wheel of the plurality of wheels is displaceable from a coupled position in which the wheel is attached to the wagon, to a displaced position in which the wheel is removed from the wagon.

31. The wagon of claim 23, wherein in the second position a top edge of the at least one sidewall is positioned adjacent the bottom surface of the wagon.

32. The wagon of claim 23, wherein the footwell is positionable in a first position and a second position.

33. The wagon of claim 32, wherein in the first position the footwell defines a footwell interior.

34. The wagon of claim 33, wherein in the second position, the footwell has a reduced height as compared to the first position.

35. The wagon of claim 1 further comprising a footwell extending below a bottom surface of the container.

36. The wagon of claim 35, wherein the footwell is positionable in an extended position and a storage position.

37. The wagon of claim 35, wherein the bottom surface further comprises at least one seating surface.

38. The wagon of claim 35, wherein the footwell includes a plurality of upright elements that are coupled to the bottom surface of the wagon.

39. The wagon of claim 38, wherein the plurality of upright elements comprise a plurality of rods.

40. The wagon of claim 35, wherein the footwell includes a footwell sidewall that is made of a fabric material.

41. The wagon of claim 35, wherein the handle is further positionable in a stowed position.

42. The wagon of claim 35, wherein the footwell is positioned between a first seat and a second seat of the wagon.

* * * * *